United States Patent
Kawamoto et al.

(10) Patent No.: US 6,394,941 B2
(45) Date of Patent: May 28, 2002

(54) PRESS WITH AUTOMATIC TOOL CHANGING FUNCTION AND TOOL CARTRIDGE CHANGING DEVICE

(75) Inventors: Makoto Kawamoto; Takahiko Murayama, both of Kyoto (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 0 days.

(21) Appl. No.: 09/816,137

(22) Filed: Mar. 26, 2001

(30) Foreign Application Priority Data

| Mar. 29, 2000 | (JP) | 2000-091736 |
| Mar. 29, 2000 | (JP) | 2000-091828 |
| Mar. 29, 2000 | (JP) | 2000-091829 |

(51) Int. Cl.⁷ .......................... B23Q 3/155; B21J 13/00
(52) U.S. Cl. .......................... 483/29; 72/442; 100/224; 100/918
(58) Field of Search .................. 483/28, 29, 1; 83/563; 72/442, 446, 448, 455; 100/918, 224, 232, 237, 299

(56) References Cited

U.S. PATENT DOCUMENTS

| 4,614,108 A | * | 9/1986 | Bolle et al. | 72/446 |
| 4,878,288 A | * | 11/1989 | Messner | 72/446 X |
| 5,882,285 A | * | 3/1999 | Seto et al. | 83/563 X |
| 6,010,441 A | * | 1/2000 | Agren | 483/1 |
| 6,013,017 A | * | 1/2000 | Aizawa | 483/29 |

FOREIGN PATENT DOCUMENTS

| DE | 3620964 | * | 1/1988 | 483/29 |
| JP | 55-100833 | * | 8/1980 | 72/455 |
| JP | 57-109533 | * | 7/1982 | 483/29 |
| JP | 130428 | * | 7/1985 | 72/448 |
| JP | 2-187222 | * | 7/1990 | 483/29 |
| JP | 6-126352 | * | 5/1994 | 483/29 |
| SU | 1530318 | * | 12/1989 | 483/29 |
| WO | 91/00784 | * | 1/1991 | 483/29 |

* cited by examiner

Primary Examiner—William Briggs
(74) Attorney, Agent, or Firm—Armstrong, Westerman & Hattori, LLP

(57) ABSTRACT

The present invention provides a press with an automatic tool changing function which can reduce the amount of time required to change cartridges. A punch press 1 uses cartridges 2 with tools mounted thereon to press works W, and has a change position 7 where the cartridges 2 are changed. A cartridge transferring and loading device 5 is provided which draws out the cartridges 2 from the change position 7 via a linear path L and transfers and loads the cartridges in a cartridge magazine 3 located on an extension of the linear path L. The transferring and loading device 5 has a cartridge moving-in and -out mechanism 19 that moves both forward and backward to transfer and load the cartridges 2 both in the punch press 1 and in the magazine 3.

5 Claims, 17 Drawing Sheets

PRESS WITH AUTOMATIC TOOL CHANGING FUNCTION AND TOOL CARTRIDGE CHANGING DEVICE

FIELD OF THE INVENTION

The present invention relates to a press with an automatic tool changing function which is a punch press having a function of automatically changing cartridges with tools mounted thereon. The present invention also relates to a tool cartridge changing device for exchanging a cartridge between a cartridge magazine and a production machine such as a punch press which uses cartridges with tools mounted thereon.

BACKGROUND OF THE INVENTION

A conventional cartridge-type press with an automatic tool changing function comprises cartridge magazines 102 arranged in parallel in such a manner as to extend in opposite directions from a punch press 101, and a transferring and loading cart 103 that can run between a cartridge changing position 101a of the punch press 101 and each of the cartridge magazines 102, as shown in FIG. 21 (The Unexamined Japanese Patent Application Publication (Tokkai-Hei) 11-290072).

Further, another such a press has been proposed which has a running path for the transferring and loading cart 103 arranged between the row of cartridge magazines 102 and a work table 104, as shown in FIG. 22.

Cartridges are transferred between the punch press 101 and the transferring and loading cart 103 using a cartridge advancing and retreating device provided in the punch press 101. The cartridges are transferred between each of the magazines 102 and the transferring and loading cart 103 using a cartridge moving-in and -out mechanism provided in each magazine.

In both of the proposed examples, however, to exchange cartridges 105 between the punch press 101 and the cartridge magazine 102, the cartridges 105 must be mounted on the transferring and loading cart 103, which must then be run. Even when the cartridges 105 are to exchanged with the cartridge magazine 102 located closest to the punch press 101, the transferring and loading cart 103 must be run. Thus, a large amount of time has been required to change the cartridges 105.

Further, the above configuration requires the cartridge moving-in and -out mechanism for each of the large number of cartridge magazines 102. These cartridge moving-in and -out mechanisms each have a drive source and the cartridge magazine 102 thus has a complicated configuration, thereby increasing costs.

Furthermore, the cartridge advancing and retreating device of the punch press 101 must have a large stroke to allow the cartridges to be moved into and out from the transferring and loading cart 103. The cartridge advancing and retreating device is a mechanism provided for selecting one of the tools on the cartridges by moving the cartridges, and if the stroke is excessively increased to allow this device to be also used to change the cartridges, thermal expansion must be taken into consideration and other accuracy problems may occur. The above example comprises a cartridge type punch press, but similar problems generally occur in production machines using cartridges.

As an invention that solves these problems, the applicant has proposed a device including the cartridge moving-in and -out mechanism mounted on the transferring and loading cart (The Unexamined Japanese Patent Application (Tokugan 2000-051315). This invention is insufficient in terms of the capability of efficiently transferring and loading a plurality of cartridges. Another problem with this invention is that a setup operation such as replacement of the tools mounted on the cartridges is inefficient.

It is an object of the present invention to provide a press with an automatic tool changing function which can reduce the amount of time required to change cartridges.

It is another object of the present invention to simplify a mechanism for changing cartridges to save space and further reduce the amount of time for the change.

It is yet another object of the present invention to further simplify the mechanism for changing cartridges to reduce costs.

It is still another object of the present invention to provide a tool cartridge changing device that can simplify the entire production facility including a production machine and magazines and can reduce the amount of time required to change cartridges.

It is still another object of the present invention to provide a tool cartridge changing device that can simplify the entire production facility including a production machine and magazines and can efficiently set up cartridges.

It is still another object of the present invention to enable both a punch tool and a die tool to be set up easily, the punch tool and the die tool each being mounted on a corresponding one of a vertical pair of cartridges.

It is still another object of the present invention to enable safe setup operations.

SUMMARY OF THE INVENTION

A press with an automatic tool changing function according to the present invention comprises a punch press for using cartridges with tools mounted thereon to process works, the punch press having a change position where the cartridges are changed, and a cartridge transferring and loading device for drawing out the cartridges from the changing position via a linear path and transferring and loading the cartridges on a cartridge magazine located on an extension of the linear path.

With this configuration, the cartridge transferring and loading device draws out the cartridges from the change position of the punch press via the linear path and transfers and loads the cartridges in the cartridge magazine located on the extension of the linear path. Thus, the cartridges can be transferred and loaded in the cartridge magazine without the need to run the transferring and loading cart, thereby reducing the amount of time required to change the cartridge.

According to the present invention, the cartridge transferring and loading device may have a cartridge moving-in and -out mechanism that moves both forward and backward to transfer and load the cartridges both at the change position of the punch press and in the cartridge magazine.

With this configuration, the cartridge moving-in and -out mechanism moves both forward and backward to transfer and load the cartridges both at the change position of the punch press and in the cartridge magazine. Thus, one continuous operation of the single cartridge moving-in and -out mechanism allows the cartridges to be drawn out from the punch press and housed in the cartridge magazine, thereby eliminating useless movements. Consequently, energy is saved and the configuration of the cartridge transferring and loading device is simplified, thereby saving space and further reducing the amount of time required to change the cartridges.

The cartridge moving-in and -out mechanism may use one actuator to drive both the moving-forward and -backward operations. Thus using the only one actuator serves to further reduce the structure and costs.

A tool cartridge changing device of the present invention changes cartridges for a production device for processing works using tools mounted on the cartridges, and comprises a transferring and loading cart that runs on a linearly extending running path and a plurality of cartridge magazines arranged close to and parallel with the running path and in each of which the cartridges can be housed. The transferring and loading cart has a plurality of cartridge housing sections provided at the same pitch as an arrangement pitch of the cartridge magazines and cartridge moving-in and -out mechanisms each provided so as to correspond to one of the cartridge housing sections, for moving the cartridges into and out from the cartridge housing section. With this configuration, since the cartridge transferring and loading device has the cartridge moving-in and -out mechanisms that can move the cartridges in and out, the cartridge magazines and the production machine are not required to have a drive mechanism for allowing the cartridges to be transferred and loaded. Thus, even if a large number of cartridge magazines are provided, the individual magazines are not required to have a drive mechanism for moving the cartridges in and out, resulting in a simple configuration. Since the transferring and loading cart has the plurality of cartridge housing sections, it is possible to receive used cartridges in an empty cartridge housing section and then insert other cartridges housed in another corresponding cartridge housing section into the production machine. Thus, the removal of the used cartridges and the insertion of the new cartridges can be carried out without repeating the running of the transferring and loading cart. Further, the pitch of the plural cartridge housing sections equals the arrangement pitch of the cartridge magazines, thereby enabling the plurality of cartridges to be simultaneously transferred and loaded with the transferring and loading cart remaining stopped. Accordingly, the amount of time required to change the cartridges is reduced.

According to the present invention, cartridge moving-in and -out mechanism control means may be provided for operating the plurality of cartridge moving-in and -out mechanisms of the moving cart in parallel.

When the plurality of cartridge moving-in and -out mechanisms of the moving cart are thus operated in parallel, the plurality of cartridges can be simultaneously transferred and loaded, thereby further reducing the amount of time required to change the cartridge.

The cartridge moving-in and -out mechanism control means operates each of the cartridge moving-in and -out mechanisms in such a manner as to move the cartridges from one of the cartridge housing sections of the transferring and loading cart to the cartridge magazine while loading the cartridges from the cartridge magazine in the other cartridge housing section. When the cartridges are thus moved from one of the cartridge housing sections of the transferring and loading cart to the cartridge magazine while the cartridges from the cartridge magazine are loaded in the other cartridge housing section, the plurality of cartridges from the cartridge magazines can be simultaneously changed while the working cart is stopped, thereby further reducing the amount of time required for the change.

A tool cartridge changing device according to the present invention changes cartridges with tools mounted thereon for a production machine that uses the cartridges, and comprises a transferring and loading cart which has a cartridge moving-in and -out mechanism mounted thereon for moving the cartridge in and out and which runs on a linearly extending running path, a plurality of cartridge magazines contiguously arranged close to and parallel with the running path and in each of which the cartridges can be housed, and a setup station arranged contiguously arranged at an end of a row of cartridge magazines in an arrangement direction thereof and in each of which the cartridges can be housed.

With this configuration, since the cartridge transferring and loading device has the cartridge moving-in and -out mechanisms that can move the cartridges in and out, the cartridge magazines and the production machine are not required to have a drive mechanism for allowing the cartridges to be transferred and loaded. Thus, even if a large number of cartridge magazines are provided, the individual magazines are not required to have a drive mechanism for moving the cartridges in and out, resulting in a simple configuration. Additionally, since the setup station is arranged contiguously at the end of the row of contiguously arranged cartridge magazines in the arrangement direction thereof, the transferring and loading cart with the cartridge moving-in and -out mechanism can automatically move the cartridges into and out from the setup station. Further, the setup station is arranged at the end of the row of cartridge magazines, thereby allowing a setup operation to be performed in a large space. Thus, the cartridges can be efficiently set up.

According to the present invention, the production machine may be a punch press using a vertical pair of cartridges each having a punch tool and a die tool mounted thereon. In this case, the cartridge moving-in and -out mechanisms of the transferring and loading cart, the cartridge magazines, and the setup station may each allow the vertical pair of cartridges to be simultaneously moved thereinto and out therefrom, and the setup station may have a vertical-cartridge shifting mechanism for sliding the lower cartridge in a horizontal direction relative to the upper cartridge.

If the setup station thus has the vertical-cartridge shifting mechanism, the lower cartridge with the die mounted thereon can be slid to form a large space above. Thus, the setup operation such as replacement of the die of the lower cartridge can be easily performed without being obstructed by the upper cartridge. According to the present invention, the setup station may have an opening and closing cover that covers a stored portion of the cartridge from above and interlock means for disabling the transferring and loading cart from moving to the setup station while the opening and closing cover is open.

With this configuration, the opening and closing cover of the setup station is normally closed, thereby preventing the cartridges stored in the setup station and the interior thereof from being contaminated with surrounding dusts or the like. The cartridges can be set up with the opening and closing cover open. While the opening and closing cover is open, the interlock means disables the transferring and loading cart from moving to the setup station. Consequently, the transferring and loading cart is prevented from unexpectedly moving to interfere with an operator or components of the setup station, or the like to enable safe setup operations.

DETAILED DESCRIPTION OF THE PREFERRED EMBODIMENTS

Figure 1:
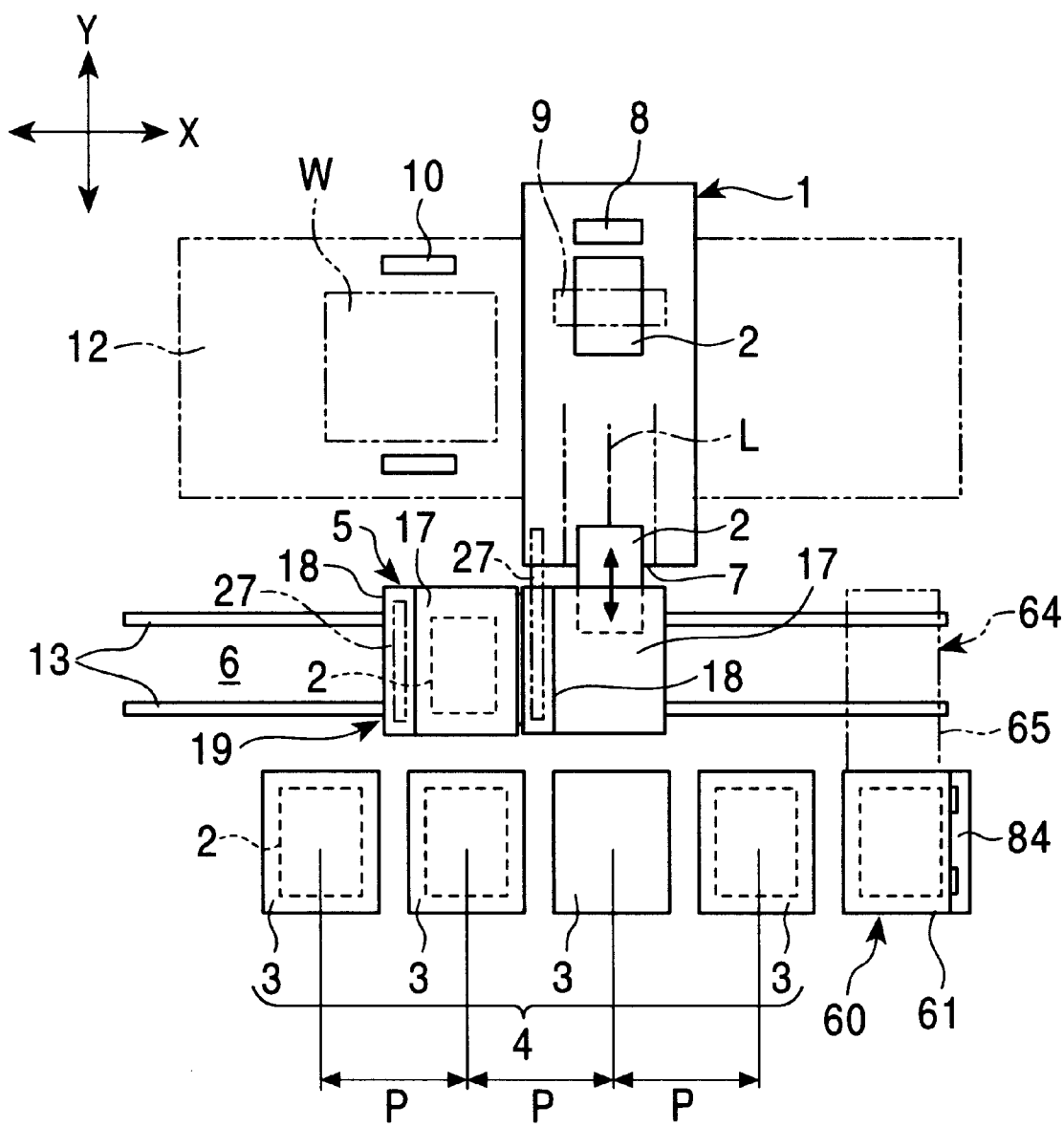
FIG. 1 is a top view of a press with an automatic tool changing function according to one embodiment of the present invention.

One embodiment of the present invention will be described with reference to the drawings. FIG. 1 is a schematic top view of the entire press with an automatic tool changing function.

A punch press 1 is a machine for processing works using changeable cartridges 2 and has a change position 7 as a cartridge entry. The punch press 1 has a linearly extending running path 6 for a cartridge transferring and loading device 5 on the change position 7 side of the punch press 1, and a plurality of cartridge magazines 3 are arranged in parallel with one another and with the running path 6 to accommodate replacement cartridges 2 therein. The cartridge magazines 3 (hereafter simply referred to as "magazines") are arranged in a row to constitute a magazine row 4. The magazine row 4 is linearly formed where the magazines 3 are contiguously arranged at a fixed pitch (P). Each magazine 3 of the magazine row 4 is provided opposite to the change position 7 of the punch press 1 in such a manner that center lines of the magazine and the punch press are aligned with each other. The row of magazines 3 have a setup station 60 located next to an end thereof in an arrangement direction thereof. A cartridge transferring and loading device 5 is of a running cart type which runs on rails laid along the magazine row 4. The cartridges 2 each comprise, for example, a tool support having a tool mounted thereon.

Figure 13:
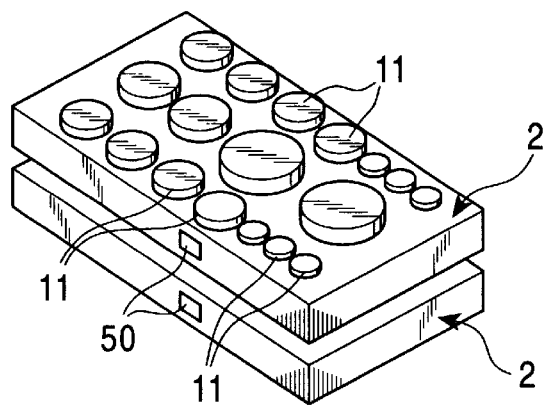
FIG. 13 is a schematic perspective view of cartridges.

The punch press 1 has a cartridge advancing and retreating device 8 for moving the cartridges 2 within the machine in a predetermined direction (direction Y), a processing section 9 that operates on the cartridges 2, and a work feeding mechanism 10 for moving a work W. The two cartridges 2 form a vertical pair and each have a tool 11 mounted thereon as a punch tool or a die tool, as shown in FIG. 13. The cartridge advancing and retreating device 8 and the cartridge transferring and loading device 5 of the punch press 1 in FIG. 1 move the vertical pair of cartridges 2 at the same time. Each magazine 3 stores the vertical pair of cartridges 2. The cartridge advancing and retreating device 8 and the cartridge transferring and loading device 5 may each move one of the vertical pair of cartridges 2 or move both of them independently. In the case of a punch press, the processing section 9 of the punch press 1 comprises a punch driving device for beating the punch tool on the upper cartridge 2. The work feeding mechanism 10 advances and retreats the work W on a table 12 in a direction (direction X) orthogonal to a cartridge advancing and retreating direction (direction Y).

Figure 2:
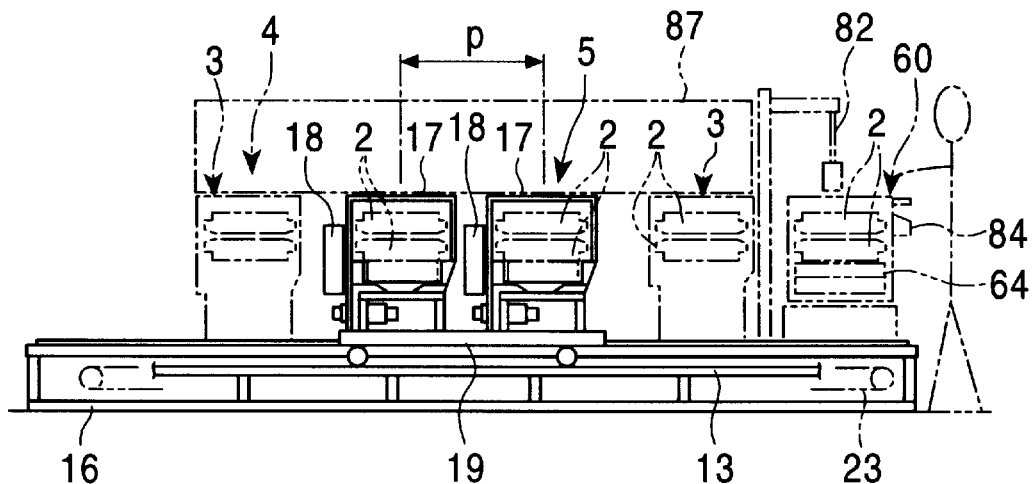
FIG. 2 is a front view of a cartridge changing device and a group of magazines in the press.

As shown in FIG. 2, each magazine 3 comprise intra-magazine guide means 14 provided in a magazine body 15 and on which the cartridges 2 are placed so as to be freely moved out. The intra-magazine guide means 14 supports opposite edges of each cartridge 2 and comprises a roller, rails, or the like. The intra-magazine guide means 14 comprises an upper and a lower stages so as to support the vertical pair of cartridges 2. The magazine body 15 is configured as a box-shaped body in which the cartridges 2 can be stored or as a frame supporting the intra-frame guide means 14, and it has the magazine guide means 14 provided on opposite sides thereof. The magazine bodies 15 of the magazines 3 of each magazine row 4 are installed on a common magazine supporting table 16.

The cartridge transferring and loading device 5 comprises a cartridge housing section 17 having the cartridges 2 mounted thereon so that the cartridges 2 can be moved thereinto and out therefrom and a cartridge moving-in and -out mechanism 18 for moving the cartridges 2 into and out from the cartridge housing section 17, both components being placed on the transferring and loading cart 19. The cartridge transferring and loading device 5, in this example, comprises a plurality of cartridge housing section 17 arranged on the transferring and loading cart 19 in parallel and each of which has the cartridge moving-in and -out mechanism 18. The plurality of cartridge housing sections 17 have the same configuration. An arrangement pitch (p) of the plural cartridge housing sections 17 equals an arrangement pitch (P) (FIG. 1) of the magazines 3. The transferring and loading cart 19 is driven to advance and recede by means of a running device 23. The running device 23 may be installed along the rails 13 or may be of a self-running type which has a drive source mounted on the transferring and loading cart 19.

Figure 3:
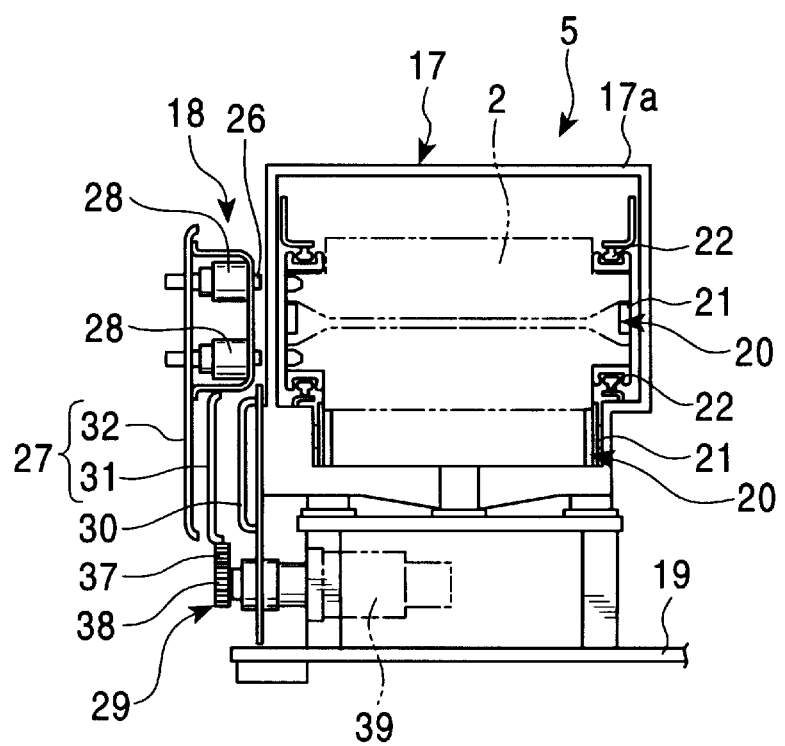
FIG. 3 is a partly enlarged front view of the cartridge changing device.
Figure 4:
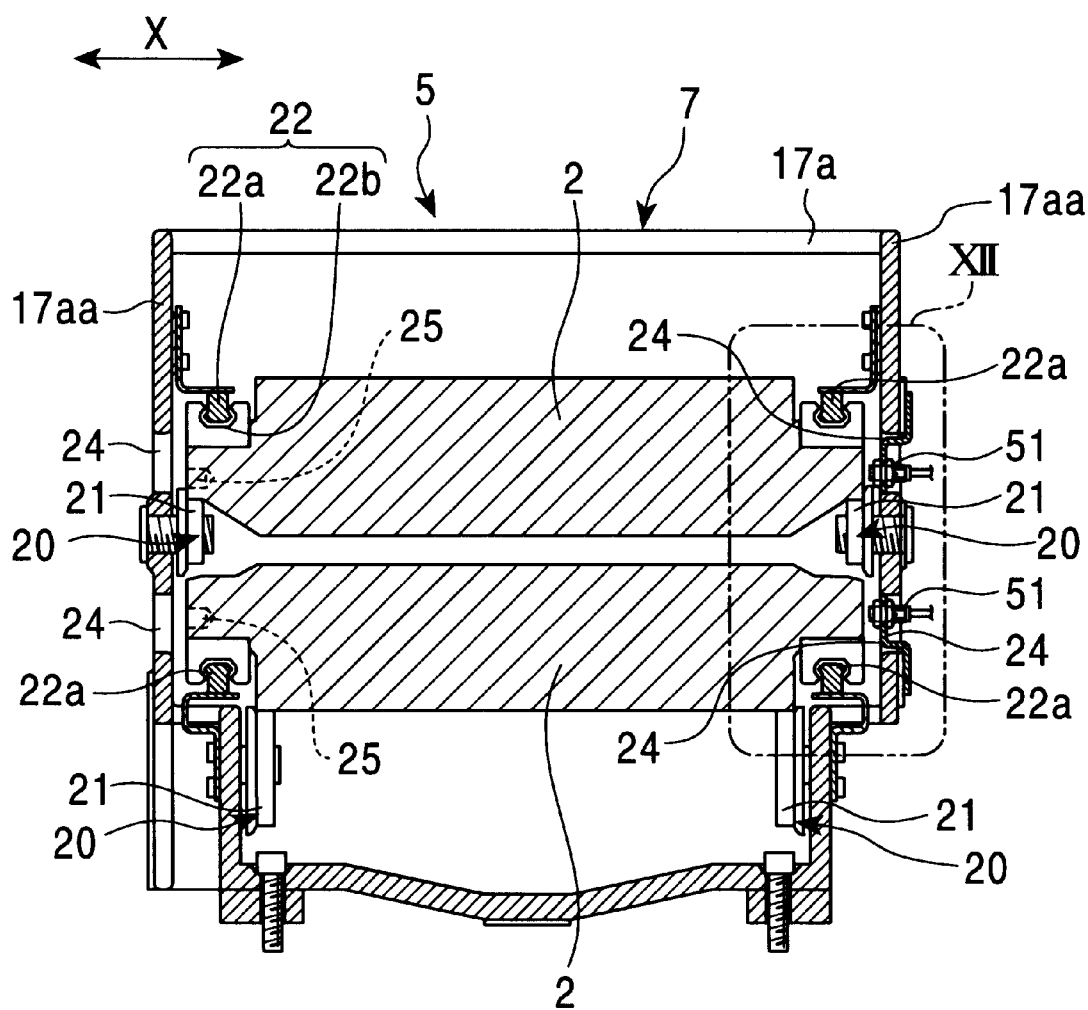
FIG. 4 is an enlarged exploded front view of a cartridge housing section of the cartridge changing device.

FIG. 3 is a schematic front view of one of the cartridge housing sections 17 of the cartridge transferring and loading device 5 and one of the cartridge moving-in and -out mechanisms 18 thereof. FIG. 4 is an enlarged exploded front view of the cartridge housing section 17.

The cartridge housing section 17 comprises a box-shaped frame 17a which is open in its front and rear and which has support guides 20 on its opposite side walls 17aa, the support guides receiving opposite edges of the cartridges 2 in such a manner that the cartridges 2 can move forward and backward. The support guides 20 form a vertical pair so as to support each of the vertical pair of cartridges 2.

Figure 5:
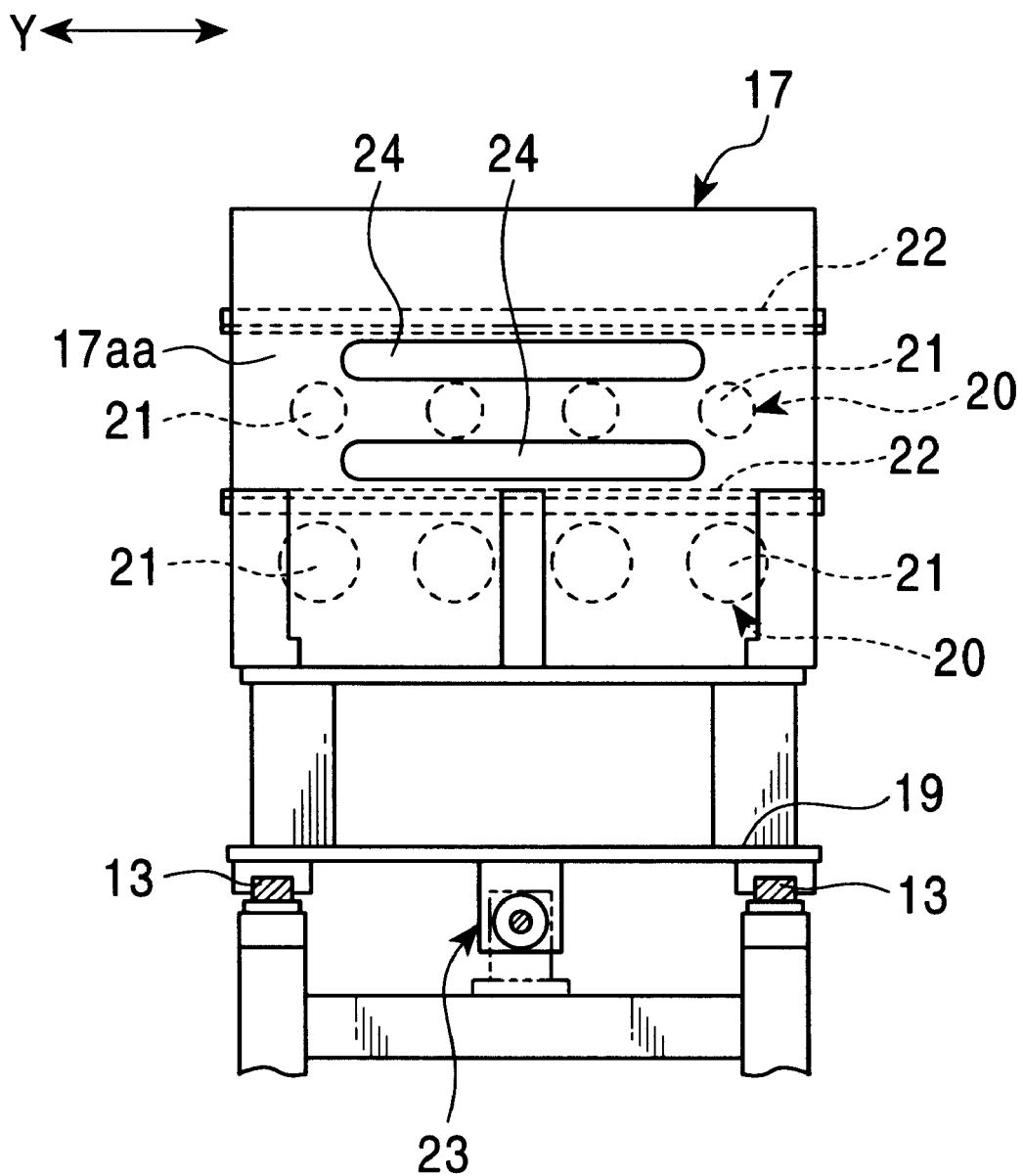
FIG. 5 is a side view of the cartridge housing section.

The support guides 20 comprise a plurality of support rollers 21 that receive bottom surfaces of the cartridges 2. The plurality of support rollers 21 are arranged in a longitudinal direction of the cartridge housing section 17 (see FIG. 5).

Further, as shown in FIG. 4, the box-shaped frame 17a of the cartridge housing section 17 has bearing rails 22a of direct-acting bearings 22 provided on each of the opposite side walls 17aa. The direct-acting bearings 22 each comprise the bearing rail 22a and a bearing portion 22a which engages with the bearing rail 22a, and the bearing portion 22b internally has a plurality of rolling bodies (not shown in the drawings) which are in rolling contact with the bearing rail 22b. The bearing portion 22b is formed in the cartridge 2. The direct-acting bearings 22 are provided to guide the cartridges 2 within the punch press 1, and bearing rails 22a inherently used for guiding are provided in the punch press 1. Accordingly, the bearing rails 22a in the cartridge housing section 17 act as dummy rails for preventing the rolling bodies of the bearing portion 22b from slipping out or preventing dusts from entering the cartridges 2. The bearing rails 22a can be freely inserted into and removed from the bearing portions 22b, and the bearing rails 22a of the cartridge housing section 17 have their ends aligned with the bearing rails (not shown in the drawings) of the punch press 1.

The direct-acting bearings 22 can support the cartridges 2 in a lateral direction or in a vertical direction. Further, the direct-acting bearings 22 are arranged on a top surface side of the upper cartridge 2 and on a bottom surface side of the lower cartridge 2.

Although not shown, the bearing rails 22a, acting as dummy rails, are also provided in each magazine 3.

The frame 17a of the cartridge housing section 17 has engaging-member inserting windows 24 opened in the side walls 17aa and extending in a longitudinal direction. The engaging-member inserting windows 24 are each formed at a height corresponding to an engaged portion 25 formed in a side surface of each cartridge 2. The engaging-member inserting window 24 allows an engaging member 26 of the cartridge moving-in and -out mechanism 18 (FIG. 3) to be inserted therethrough. Moreover, the magazine body 15 of each magazine 3 also has an engaging-member inserting window 24A (FIG. 12) formed therein and through which the engaging member 26 of the cartridge moving-in and -out mechanism 18 is inserted.

The cartridge moving-in and -out mechanism 18 is provided at one side of the cartridge housing section 17 as shown in FIG. 3. The cartridge moving-in and -out mechanism 18 advances and recedes from both the front and rear side of the cartridge housing section 17 to transfer the cartridges 2 between the change position 7 of the punch press 1 and the magazine 3. That is, the cartridge moving-in and -out mechanism 18 is composed of a slide member 26 that can advance from both the front and rear ends of the cartridge housing section 17, cartridge engaging mechanisms 28 provided in the slide member 27 and which can be engaged with the cartridges 2, and a slide driving mechanism 29 for slidably driving the slide members 27. The slide member 27 is composed of a middle member 31 slidably installed on a base member 30 and a top member 32 slidably installed on the middle member 31. The base member 30 is fixedly installed on the cartridge housing section 17. The top member 32 has the cartridge engaging mechanism 28.

The cartridge moving-in and -out mechanism 18 will be described in detail with reference to FIGS. 6 to 9. The middle member 31 is slidably installed on the base member 30 via a slide guide 33, and the top member 32 is slidably installed on the middle member 31 via a slide guide 34. The slide guides 33, 34 respectively comprise slide rails 33a, 34a and guide rollers 33b, 34b which are in rolling contact with the slide rails 33a, 34a, respectively.

Both slide rails 33a, 34a are provided on the middle member 31, the guide rollers 33b for guiding the middle member 31 are provided on the base member 30, and the guide rollers 34b for guiding the top member 32 are provided on the top member 32. Further, the guide rail 33a for guiding the middle member 31 is provided on one side surface of the middle member 31, while the guide rail 34a for guiding the top member 32 is provided on the other side surface, in such a manner that the guide rails 33a, 34a sit back to back.

The slide rails 33a, 34a each comprise two slide rails separated from each other in the vertical direction. Some of the guide rollers 33b, 34b are rolling contact with a bottom surface of the upper slide rail 33a, 34a, and the others are rolling contact with a top surface of the lower slide rail 33a, 34a. These plurality of guide rollers 33b, 34b, corresponding to the slide rails 33a, 34a, respectively, are arranged in the longitudinal direction The guide rollers 33b, 34b each have its outer peripheral surface formed like a V-shaped groove, while the slide rails 33a, 34a has a portion which is in rolling contact with the guide rollers 33b, 34b, respectively, and which has a V-shaped cross section.

The slide driving mechanism 29 has a middle-member driving section 35 for sliding the middle member 31 relative to the base member 30 and an interlocking section 36 for sliding the top member 32 in connection with a slide operation of the middle member 31.

The middle-member driving section 35 comprises a rack 37 provided on the middle member 31, a pinion 38 engaging with the rack 37, and an actuator 39. The actuator 39 is composed of a motor with a speed reducer and is installed on the base member 30. The pinion 38 is provided on a speed reducer output shaft of the actuator 39.

Figure 8:
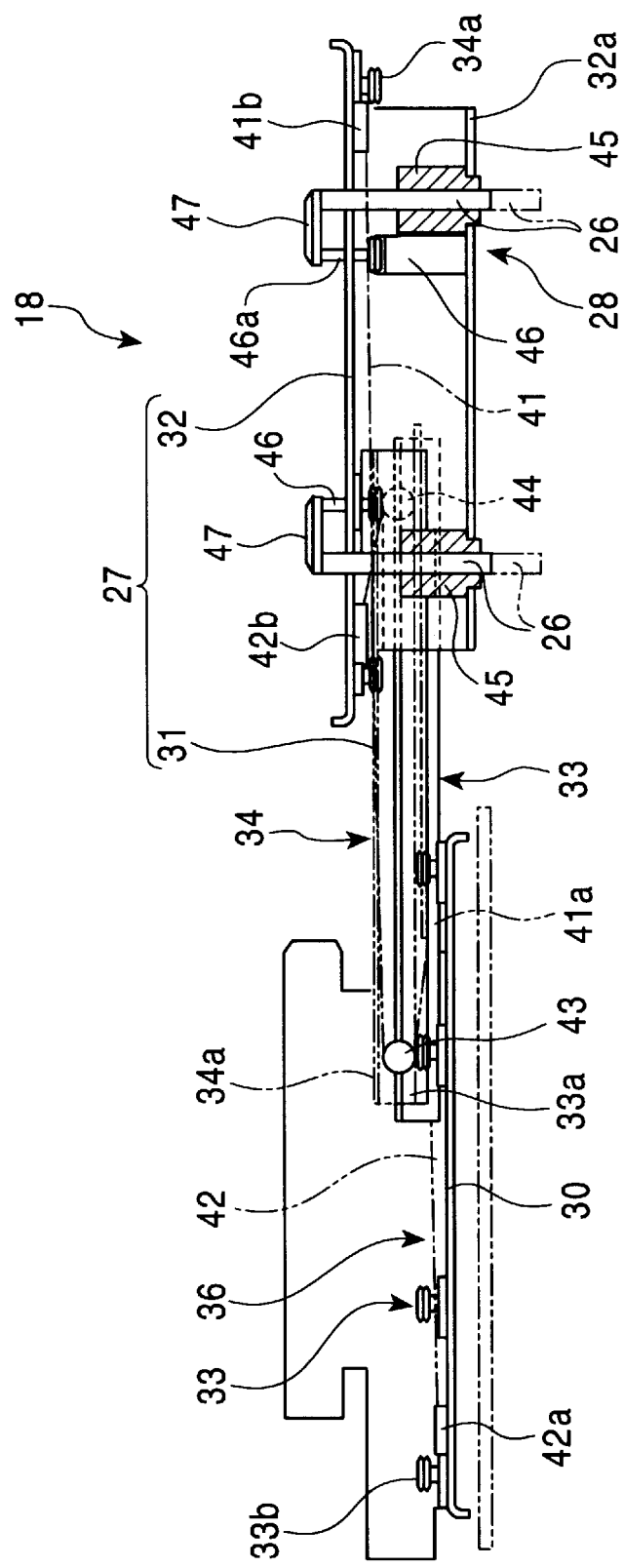
FIG. 8 is a broken top view of the cartridge moving-in and -out mechanism.

The interlocking section 36 comprises a winding mechanism. Specifically, the interlocking section 36 has a pair of interlocking belts 41, 42 for transmitting movements of the middle member 31 in opposite directions to the top member 32 as shown in FIG. 8 and FIG. 9D. The first interlocking belt 41 has its opposite ends coupled at its coupling portion s 41a, 41b to one end of the base member 30 and to one end of the top member 32 and has its middle portion passed around a pulley 43 located at the other end of the middle member 31. The second interlocking belt 42 has its opposite ends coupled at its coupling portion s 42a, 42b to the other ends of the base member 30 and the top member 32 and has its middle portion passed around a pulley 44 located at one end of the middle member 31. The first and second interlocking belts 41 and 42 are arranged in the vertical direction.

With the interlocking section 36, when the middle member 31 moves to one side (the right of FIG. 9D), the top member 32 has its coupling portion 42b pulled by the interlocking belt 42 having the middle portion thereof passed around the pulley 44 of the middle member 31, and is thus moved to one side (to the right) relative to the middle member 31. Consequently, the top member 32 moves twice as far as the middle member 31 relative to the base member 30. When the middle member 32 moves to the other side (to the left of FIG. 9D), the top member 32 is pulled by the interlocking belt 41 and thus moves to the other side twice as far as the middle member 32.

Figure 6:
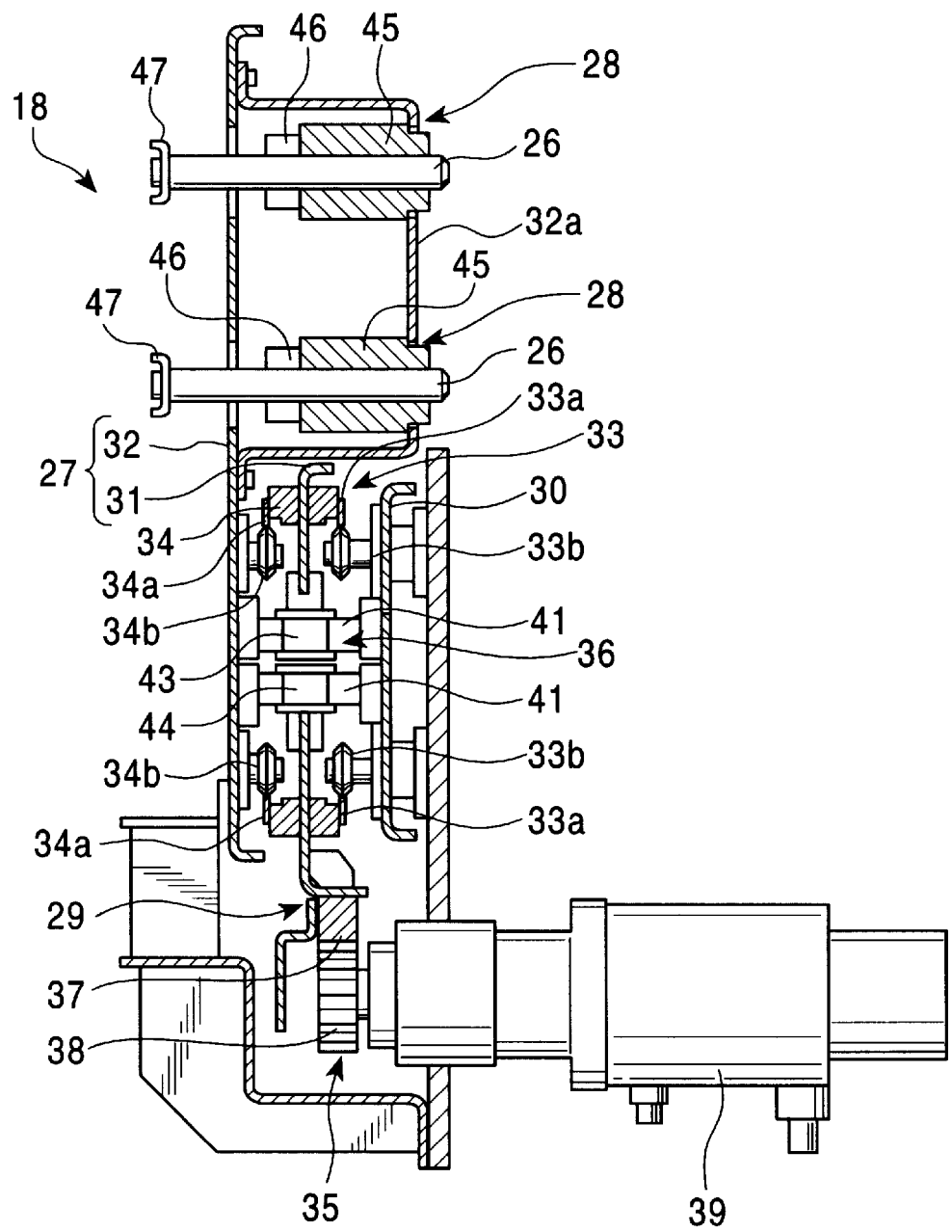
FIG. 6 is an enlarged exploded front view of a cartridge moving-in and -out mechanism of the cartridge changing device.
Figure 7:
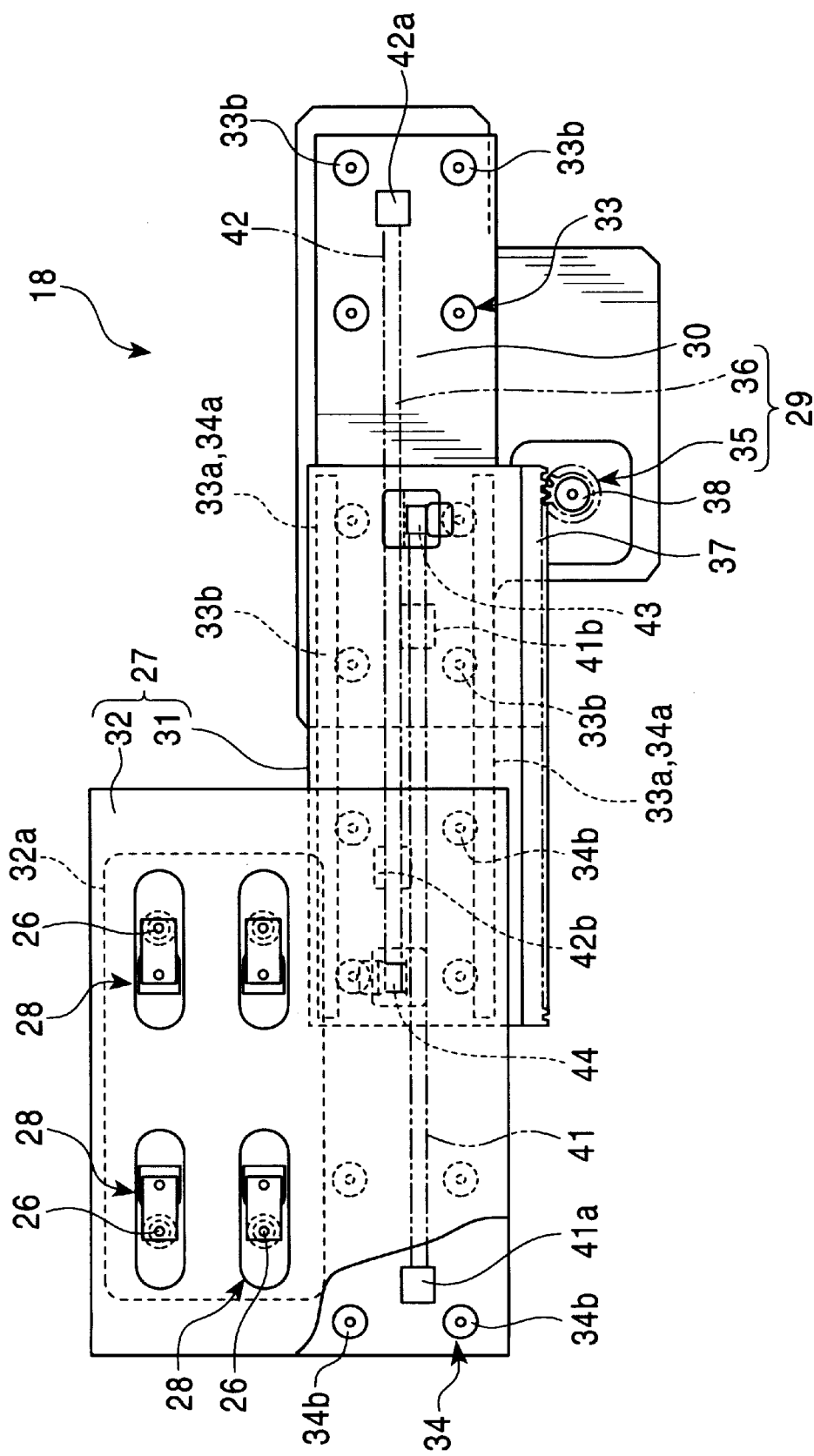
FIG. 7 is a side view of the cartridge moving-in and -out mechanism.

The cartridge engaging mechanisms 28 are means for engaging and disengaging the engaging members 26 with and from the engaged portions 25 (FIG. 4) of the cartridges 2, as shown in FIGS. 6 and 8. The engaged portion 25 is formed into a recess portion shaped like a round hole or the like, whereas the engaging member 26 is composed of a pin-shaped member such as a round pin. This pin-shaped engaging member 26 is supported by a guide member 45 so as to advance and recede freely and is advanced and retreated by engagement and disengagement driving means 46. The engagement and disengagement driving means 46 is composed of a cylinder device such as an air cylinder and has an advancing and receding shaft 46a coupled to a rear end of the pin-shaped engaging member 26. The extent to which the pin-shaped engaging member 26 advances and recedes is from a position where its tip enters the engaging-member inserting window 24 in the cartridge housing section 17 (FIGS. 4 and 5) and engages with the engaged portion 25 of the cartridge 2 to a position where its tip leaves the engaging-member inserting window 24.

The cartridge engaging mechanisms 28 are arranged in the vertical direction so as to correspond to the upper and lower cartridges 2, 2 in such a manner that the plurality of cartridge engaging mechanisms 28 are arranged separately from one another in a direction in which the slide member 27 advances and recedes. The guide member 45 and the engagement and disengagement driving means 46 of each of the cartridge engaging mechanisms 28 are attached to a engaging mechanism attaching frame 32a provided in the top member 32.

As shown in FIG. 11, a plurality of, in this example, two engaged portions 25 are formed in the cartridges 2 separately from each other in the longitudinal direction.

Figure 10:
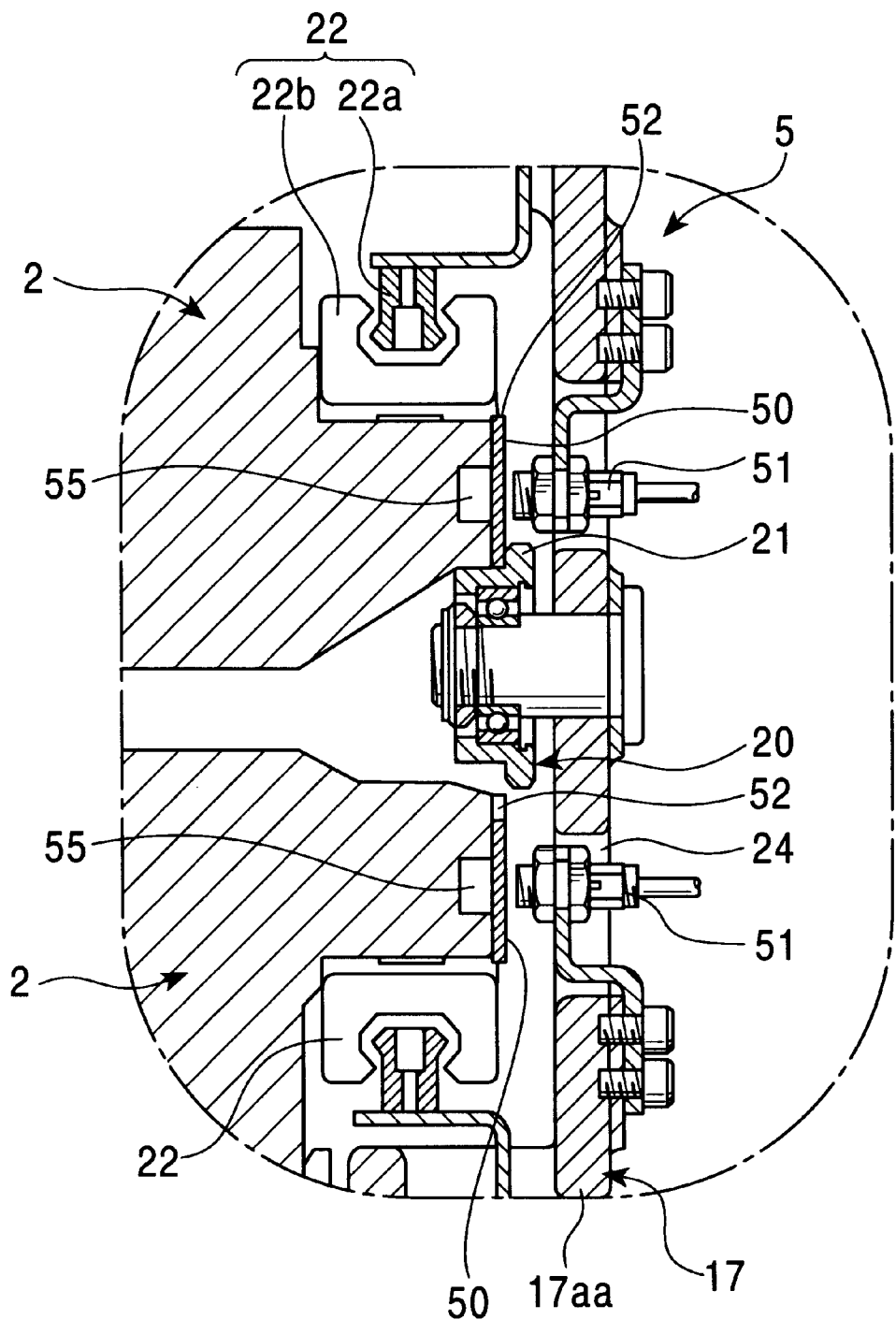
FIG. 10 is an exploded side view showing the relationship between cartridges and identifiers.

As shown in FIG. 10, each carriage 2 has an identifier 50 provided on a side surface thereof and indicating a cartridge type, and detection means 51 for detecting the identifier 50 is provided in the cartridge transferring and loading device 5. The identifier 50 comprises a member removably attached to an identifier attaching seat portion 52, for example, a plate-shaped member, which is provided on the side surface of the cartridge 2, and the identifier 50 can be replaced with another. The detection means 51 comprises, for example, a proximity sensor. In this case, the identifier attaching seat portion 52 of the cartridge 2 has a non-sensed recess portion 55.

The setup station 60 in FIG. 1 stores the cartridges 2 so that the latter can be set up. Similarly to the magazines 2, the cartridges 2 can be moved in and out by the cartridge transferring and loading device 5, which is carried by the transferred and loading cart 19. As shown in FIGS. 14 to 17, the setup station 60 has support guides 62, 63 for supporting the upper and lower cartridges 2 so as to move them in and out, the support guides 62, 63 being provided on opposite inner side portions of a setup section case 61 in which both the upper and lower cartridges 2 can be stored.

The support guides 62, 63 each comprise a plurality of support rollers 62a, 63a, respectively, which receive the bottom surface of the corresponding cartridge 2. The plurality of support rollers 62a, 63a are arranged in the direction in which the cartridges 2 are moved in and out. The support guide 62 for the upper cartridge 2 is installed on the opposite side walls of the setup section case 61, while the support guide 63 for the lower cartridge 2 is provided on a vertical-cartridge-position shifting mechanism 64 installed in the setup section case 61.

The setup section case 61 further has direct-acting bearing rails 62b, 63b on the opposite inner side portions thereof. The direct-acting bearing rails 62b, 63b are in rolling contact with the bearing portions 22b (see FIG. 4) of the cartridges 2 supported by the support guides 62, 63, and these are dummy rails.

The vertical-cartridge-position shifting mechanism 64 is means for sliding the lower cartridge 2 in the horizontal direction relative to the upper cartridge 2 in such a manner as to project the lower cartridge 2 toward a move-in and -out port in the setup section case 61.

Specifically, the vertical-cartridge-position shifting mechanism 64 is composed of a slide table 65 that slides from the setup section case 61 toward the running path 6 and a slide driving mechanism 66 for the slide table 65, and the support guides 63 are installed on the slide table 65. The slide table 65 is composed of a middle table 68 installed in the setup section case 61 so as to advance and recede freely via slide guides 67 and a cartridge table 70 installed on the middle table 68 so as to advance and recede freely via slide guides 69. The support guides 63 are installed on the cartridge table 70. The slide guides 67, 69 each comprise a direct-acting bearing or the like.

The slide driving mechanism 66 has a middle-table driving section 71 for advancing and retreating the middle table 68 relative to the setup section case 61 and an interlocking section 72 for advancing and retreating the cartridge table 70 in connection with a sliding operation of the middle table 68. The middle-table driving section 71 comprises a cylinder device. The interlocking section 72 has a interlocking belt 73 that transmits movement of the middle table 68 to the cartridge table 70. The interlocking belt 73 comprises an endless belt passed around a pair of pulleys 75, 76 provided near corresponding ends of the middle table 68, has its former and latter halves coupled to the setup section case 61 and the cartridge table 70 via coupling members 74a, 74b, respectively.

The cartridge table 70 has a slip-out preventing member 89 provided at its tip, for preventing the cartridge 2 placed on the table 70 from slipping out from the tip. The slip-out preventing member 89 can be driven to project and recede by means of a projection and recession driving means 89a composed of a cylinder device or the like, and can be engaged with an end surface of the cartridge 2 when it is lifted to project.

Figure 14:
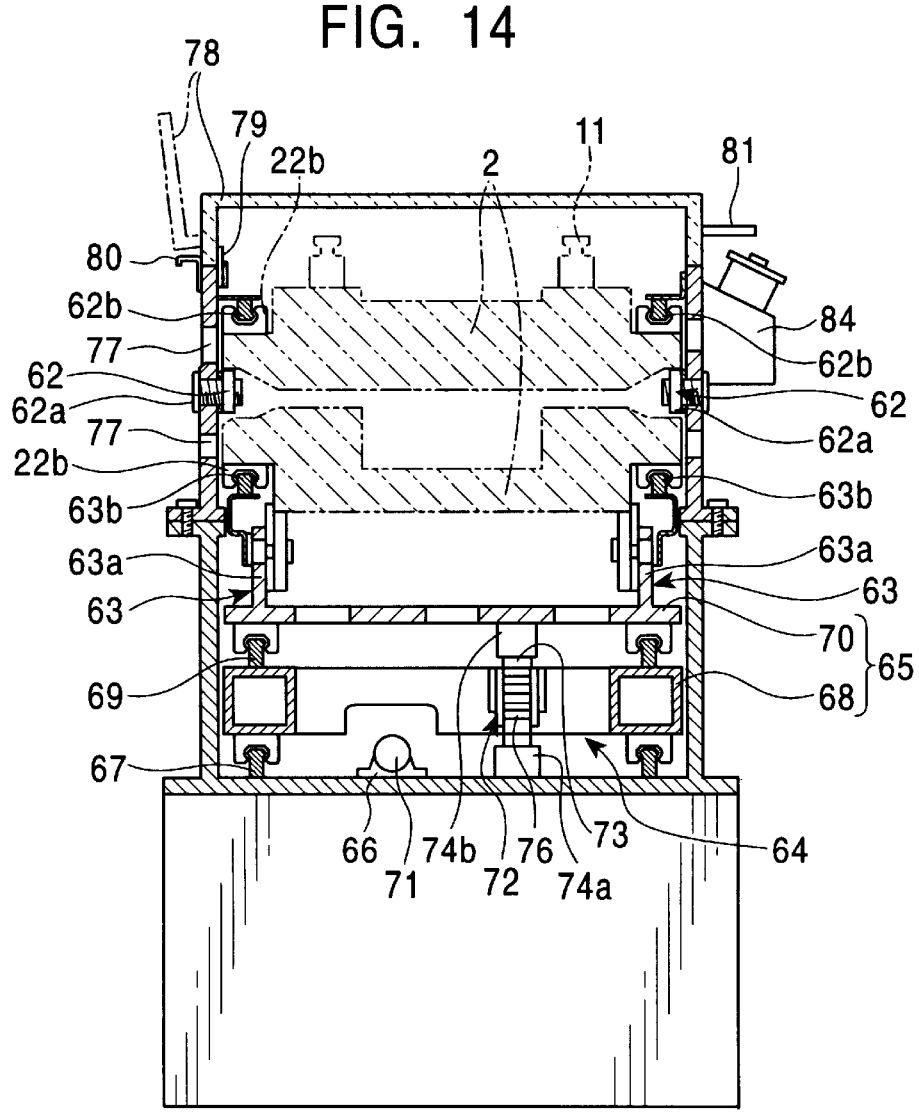
FIG. 14 is an exploded front view of a setup station.
Figure 15:
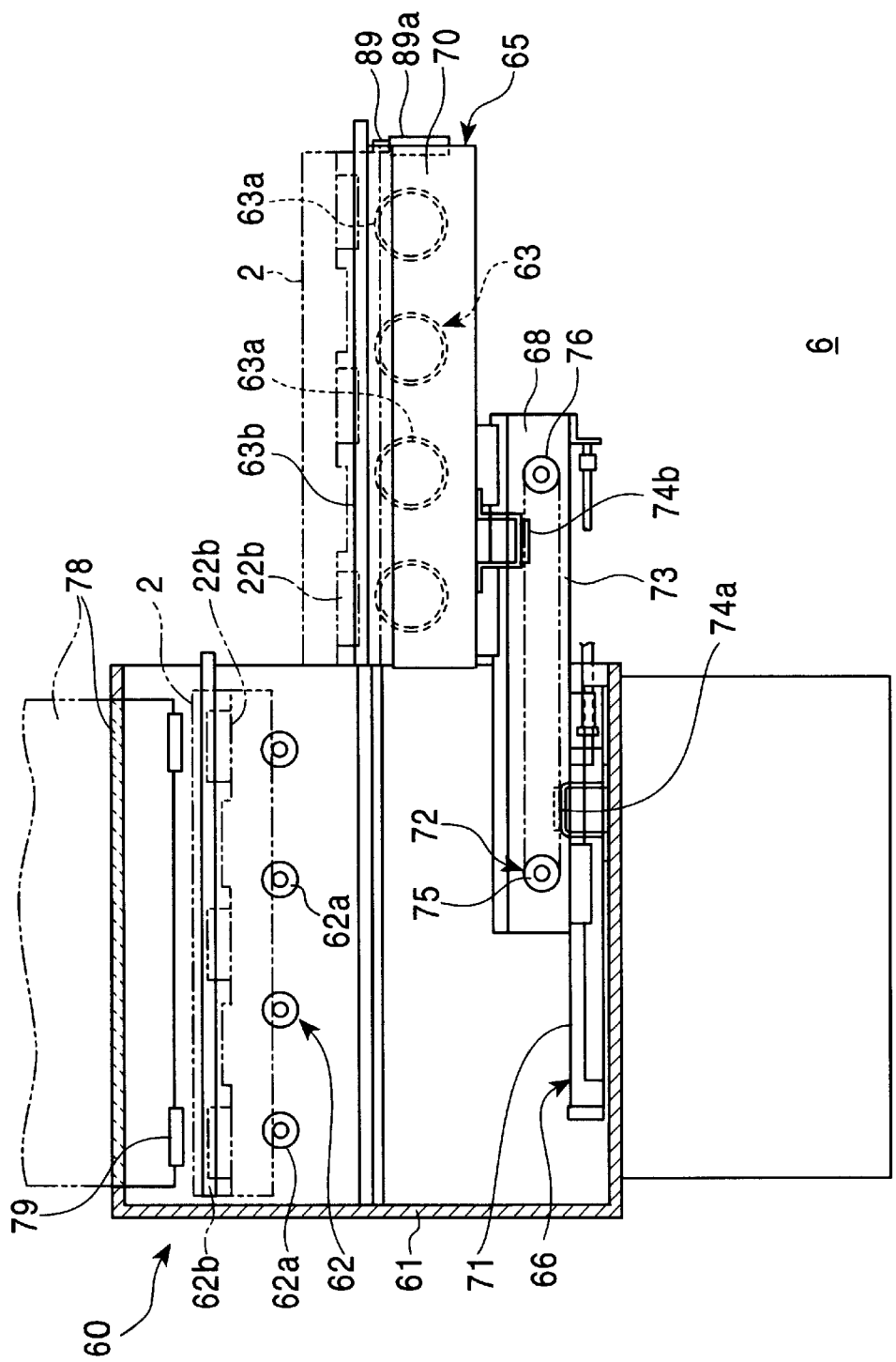
FIG. 15 is an exploded side view of the setup station.

As shown in FIG. 14, the setup section case 61 of the setup station 60 has engaging-member inserting windows 77 formed in one of the side walls thereof and through which the engaging members 26 of the cartridge moving-in and -out mechanism 18 (FIG. 3) of the cartridge transferring and loading device 5 are inserted. The setup section case 61 has a cylinder (not shown in the drawings) installed on the other side wall thereof, for advancing and retreating pins for fixing the cartridge 2 to the setup station 60.

A top surface of the setup case 61 can be freely opened and closed by an opening and closing cover 78. The opening and closing cover 78 is supported at one end so as to be rotationally moved up and down for opening and closing by means of a rotational-movement supporting member 79, and has its maximum opening angle regulated by a stopper 80. The rotational-movement supporting member 79 comprises a hinge, and the opening and closing cover 78 has a handle 81 at its free end. The opening and closing cover 78 is formed of a transparent plate such as a glass plate and its frame.

Figure 16:
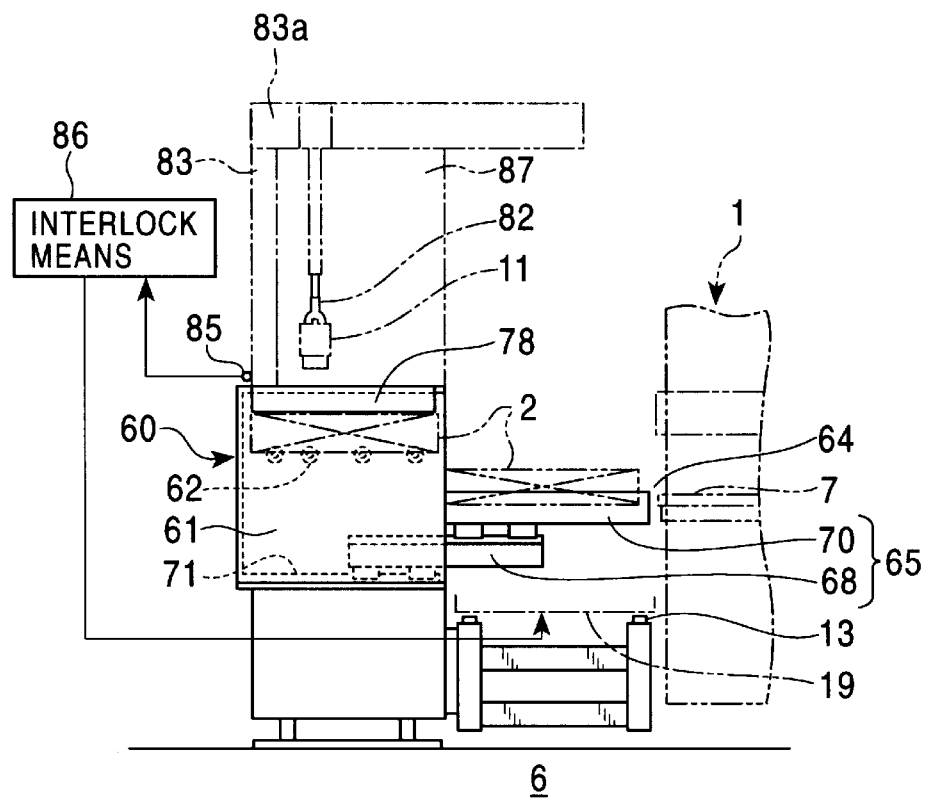
FIG. 16 is a view useful in explaining an operation of a vertical-cartridge-position shifting mechanism of the setup station showing that this mechanism is sliding.

As shown in FIG. 16, a tool-transporting auxiliary member 82 that can freely lift and move the punch tool 11 of the upper cartridge 2 is installed above the setup station 60 via a support frame 83 and a swinging arm 83a.

The opening and closing cover 78 of the setup section case 61 has a sensor 85 (FIG. 16) for detecting how the opening and closing cover 78 is open and an interlock means 86 for detecting a cover open signal from the sensor 85 to disable the transferring and loading cart 19 from running to the setup station 60. Interlocking by the interlock means 86 corresponds to control that prevents the transferring and loading cart 19 from reaching the setup station 60, and the transferring and loading cart 19 is permitted to run between the magazines 3 even during an interlocking state. The interlock means 86 preferably also provides the control that disables the transferring and loading cart 19 from running to the setup station 60 while the vertical-cartridge-position shifting mechanism 64 of the setup station 60 is performing a shifting operation.

As shown in FIG. 14, the setup section case 61 has a setup section operation panel 84 provided in an upper part of a side surface thereof so that switches provided on the setup section operation panel 84 can be operated to slidably drive the vertical-cartridge-position shifting mechanism 64 and to move the tool-transporting auxiliary member 82 (FIG. 2) in the vertical direction.

Horizontal movement of the tool-transporting auxiliary member 82 such as a horizontal swing thereof is manually effected by the operator.

Figure 18:
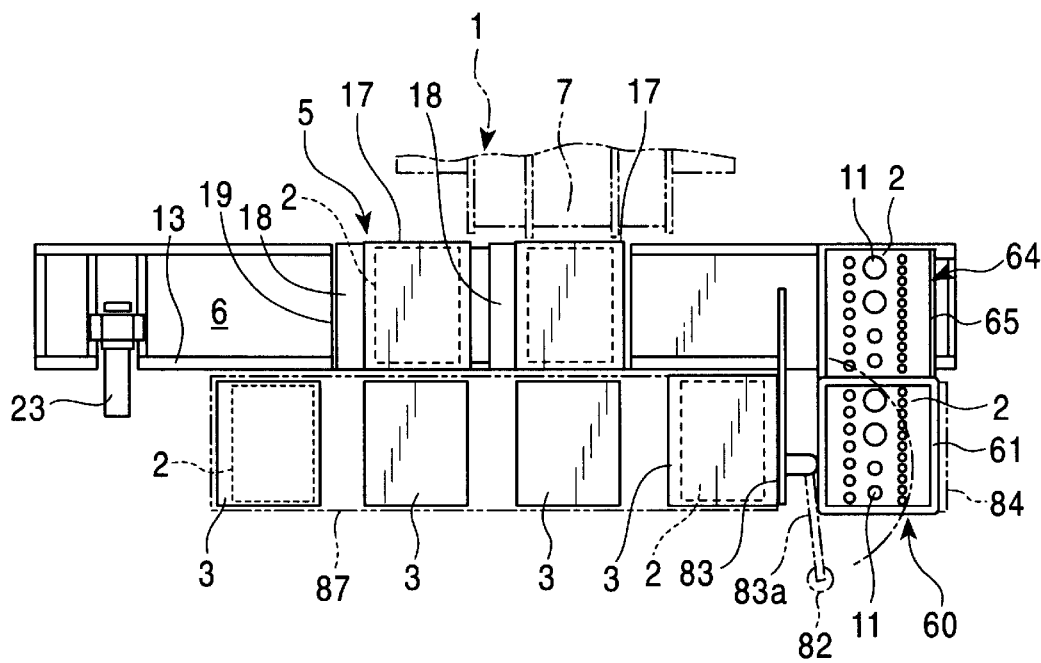
FIG. 18 is a partly exploded schematic top view of a tool cartridge changing device.

As shown in FIGS. 2 and 18, a control box 87 is installed over the plurality of arranged magazines 3, and control means provided in the control box 87 controls the cartridge transferring and loading device 5 based on a program.

Figure 19:
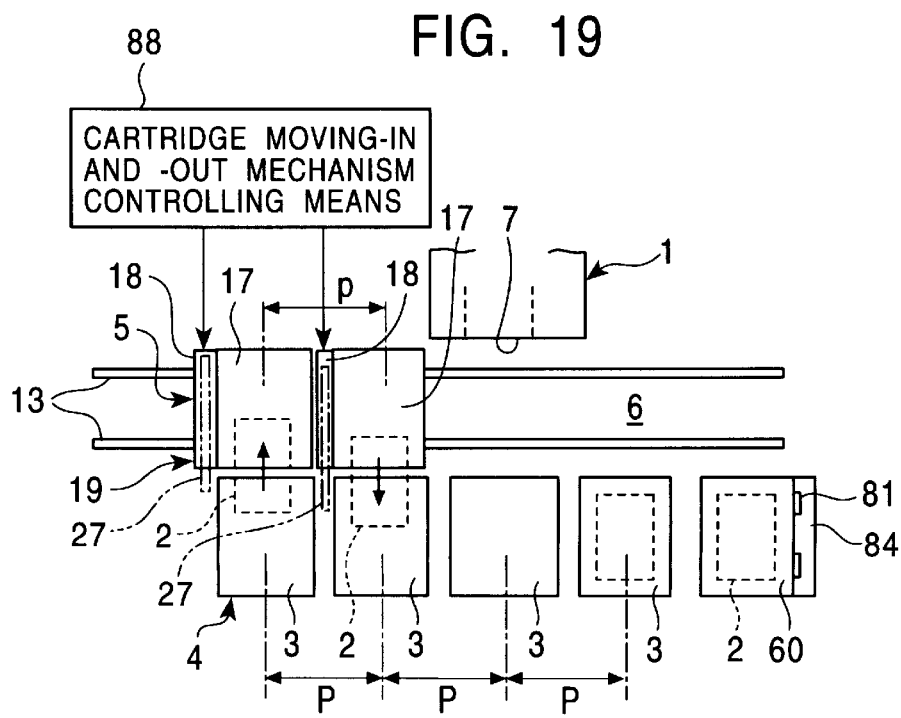
FIG. 19 is a view useful in explaining an example of a cartridge transferring and loading operation performed by the tool cartridge changing device.

As shown in FIG. 19, cartridge moving-in and -out mechanism controlling means 88 for controlling the cartridge moving-in and -out mechanism 18 is provided as control means for the cartridge transferring and loading device 5. The cartridge moving-in and -out mechanism controlling means 88 can operate a plurality of cartridge moving-in and -out mechanisms 18 of the transferring and loading cart 19 in parallel. For example, the cartridge moving-in and -out mechanism controlling means 88 operates the cartridge moving-in and -out mechanisms 18 in such a manner as to move the cartridges 2 out from one of the cartridge housing section 17 on the transferring and loading cart 19 to the corresponding magazine 3 while loading the cartridges 2 from another magazine 3 in the other cartridge holding section 17.

Figure 20A:
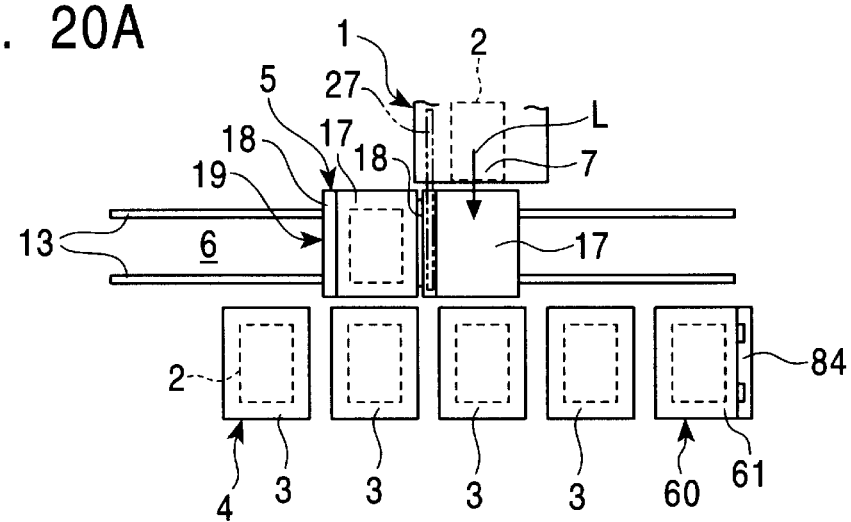
FIGS. 20A–20C are views useful in explaining another example of the cartridge transferring and loading operation performed by the tool cartridge changing device.
Figure 20B:
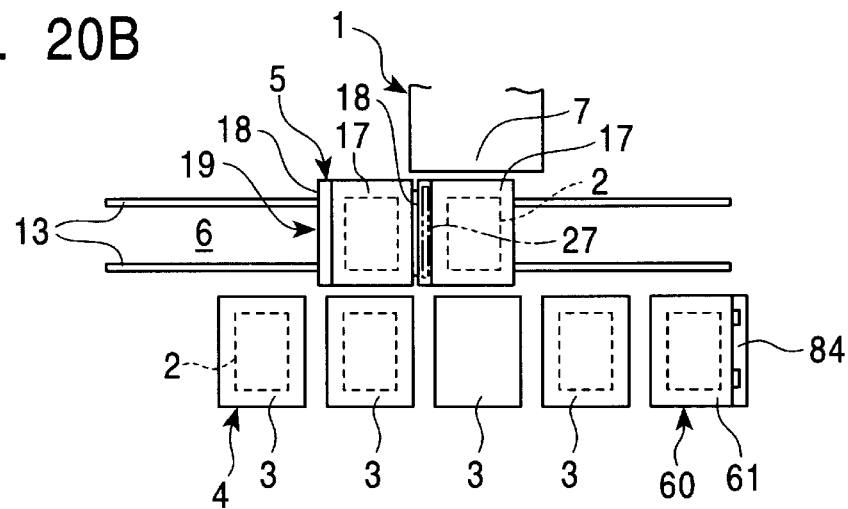

Further, the cartridge moving-in and -out mechanism controlling means 88 has a function of drawing out the cartridges 2 from the change position 7 of the punch press 1 and transferring and loading the cartridges 2 in the magazine 3 located on an extension of a linear path L constituting a withdrawal path for the cartridges, as shown in FIG. 20.

The operation of the above configuration will be explained.

In FIG. 1, the cartridge transferring and loading device 5 transfers and loads the next cartridges 2 to be used in the punch press 1, in one of the cartridge housing sections 17 from the corresponding magazine 3, while moving the other cartridge housing section 17, which is empty, to the punch press 1. For the punch press 1, first, the cartridges 2 in the punch press 1 which have become unwanted are! transferred and loaded in the empty cartridge housing section 17 and the cartridges 2 carried by the other cartridge housing section 17 are subsequently transferred and loaded in the punch press 1. The cartridges 2 received from the punch press 1 are returned by the cartridge transferring and loading device 5 to the predetermined magazine 3 corresponding to the cartridge type or the like.

In this case, since the pitch (p) of the plural cartridge housing sections 17 of the transferring ;and loading cart 19 equals the arrangement pitch (p) of the magazines 3, the plural pairs of cartridges 2 can be simultaneously transferred and loaded in the magazines 3 with the transferring and loading cart 19 remaining stopped. For example, as shown in FIG. 19, the cartridge moving-in and -out controlling means 88 operates the cartridge moving-in and -out mechanisms 18 in such a manner as to move the cartridges 2 our from one of the cartridge housing section 17 on the transferring and loading cart 19 to the corresponding magazine 3 while loading the cartridges 2 from another magazine 3 in the other cartridge housing section 17. Thus, the plural pairs of cartridges 2 can be simultaneously exchanged with the magazines 3 while the transferring and loading cart 19 is stopped, thereby further reducing the amount of time required for the changing.

Further, if the cartridges 2 taken out from the punch press 1 are to be stored in the magazine 3 located opposite to the change position 7 as shown in FIG. 20, the cartridge moving-in and -out mechanism 18 performs a single continuous operation to take out and store the cartridges 2 as described below.

Figure 20C:
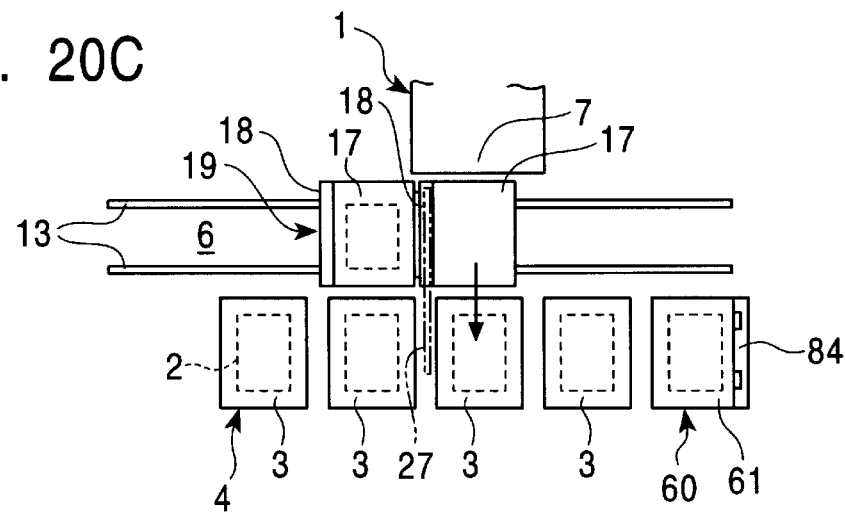
Figure 21:
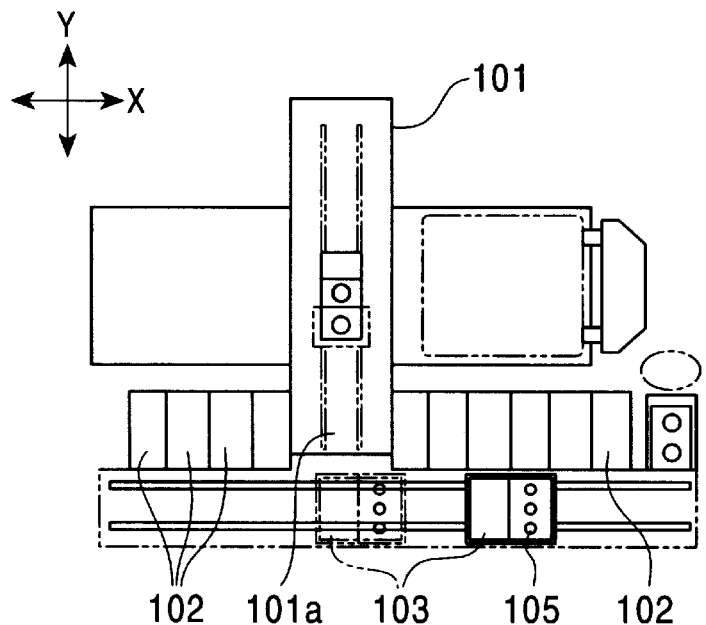
FIG. 21 is a top view of a conventional example.
Figure 22:
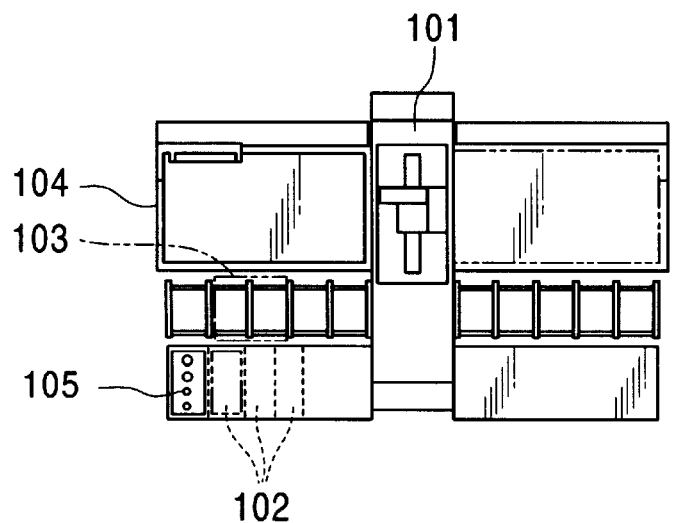
FIG. 22 is a top view of another conventional example.

The function of the cartridge moving-in and -out mechanism 18 of moving both forward and backward is used to draw out the cartridges 2 from the change position (FIG. 20A) onto the cartridge housing section 17 on the transferring and loading cart 19 via the linear path (L) (FIG. 20B) and then continuously transfer and load the cartridges in the magazine 3 located on the extension of the linear path (L) (FIG. 20C). Thus, the magazine 3 is provided opposite to the change position of the punch press 1 and the cartridge moving-in and -out mechanism 18 can move both forward and backward, so that the cartridges 2 can be transferred and loaded in the magazines 3 without the need to run the transferring and loading cart 19 as described above, thereby requiring the amount of time required to change the cartridges 2.

Figure 9:
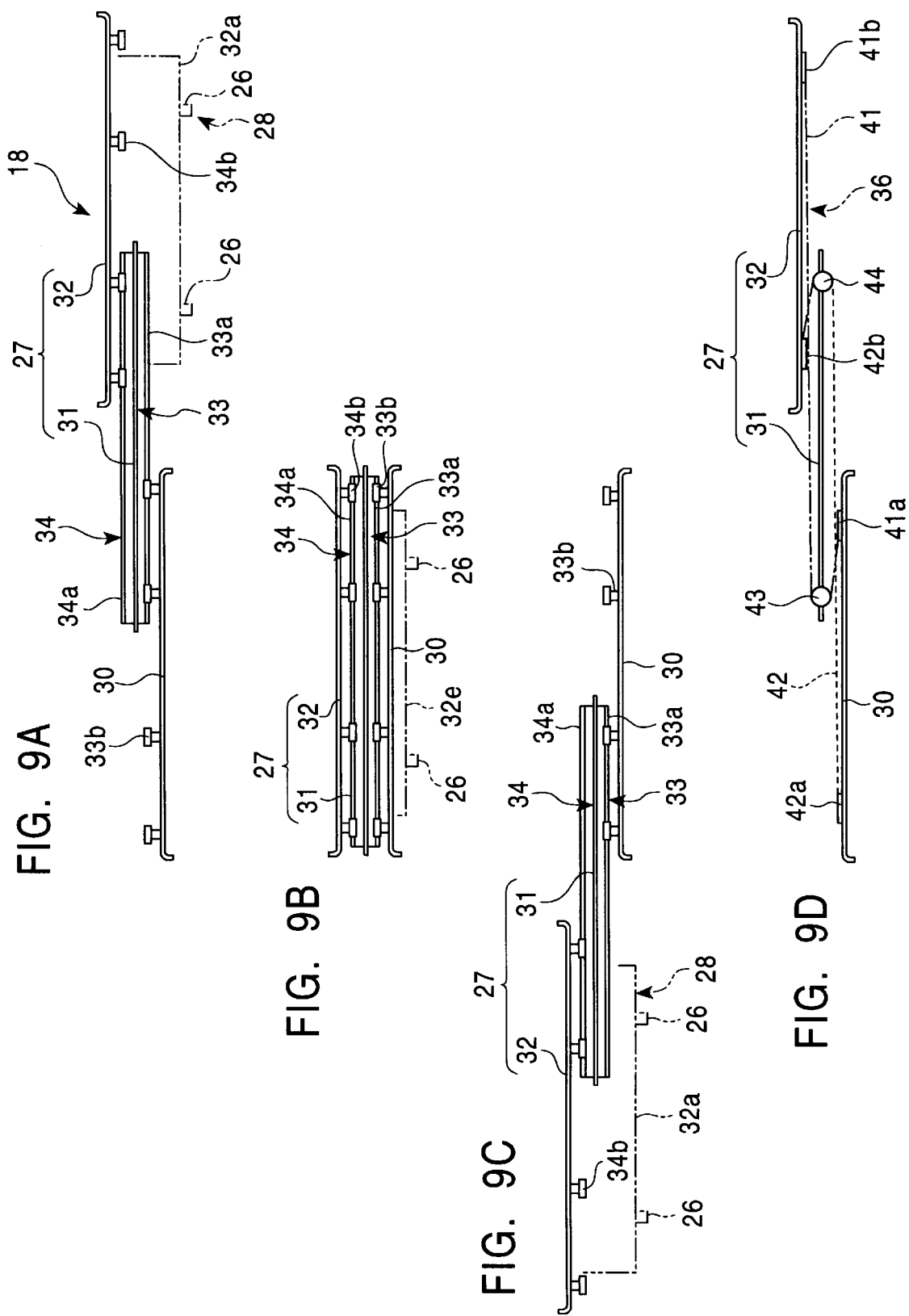
FIGS. 9A to 9C are views useful in explaining the operation of a slide member of the cartridge moving-in and out mechanism and FIG. 9D is a view useful in explaining an interlocking section of a slide driving mechanism.

The cartridge transferring and loading device 5 transfers the cartridges both forward and backward when the slide member 27 projects forward and backward from the cartridge housing section 17. That is, the engaging members 26 of the cartridge engaging mechanisms 28 (FIG. 6) provided in the slide member 27 engage with the engaged portions 25 (FIG. 10) of the cartridges 2, and the slide member 27 is moved to advance and retreat the cartridges 2 on the support guides 20. The slide member 27 comprises the two stages including the middle member 31 and the top member 32 as shown in FIG. 9, and the top member 32 with the cartridge engaging mechanisms 28 equipped thereon entirely moves forward and backward relative to the base member 30. Thus, the slide member 27 can move the cartridges 2 until the latter are entirely loaded in the magazine 3 and in the punch press 1.

When the slide member 27 advances and recedes for the transfer and loading, the engaging members 26 pass through the engaging-member inserting windows 24 in the cartridge housing section 17 (FIG. 5) but come into contact with the side walls 17aa of the cartridge housing section 17 at the opposite ends of each engaging-member inserting window 24. Thus, the cartridge engaging mechanisms 28 (FIG. 8) inserts and removes the engaging members 26 depending on the advancing and receding positions of the slide member 27. At this time, any of the plural engaging members 26 remains engaged with the corresponding engaged portion 25 of the cartridge 2.

FIG. 11 shows an operation performed when the cartridges from the cartridge transferring and loading device 5 are transferred and loaded in the punch press 1. FIG. 11C, however, shows an example of another operation, and the operation normally progresses from FIG. 11B to FIG. 11D. In FIG. 11, the engaging member 26 is fitted in a part of the engaged portion 25 which is shown by a black circle of a larger diameter and is not fitted in a part thereof which is shown by a black circle of a smaller diameter. In the longitudinal direction, the engaged portions 25 are distinguished from each other using the subscripts A, B, and the engaging members 26 are also distinguished from each other using the subscripts A, B.

Figure 11A:
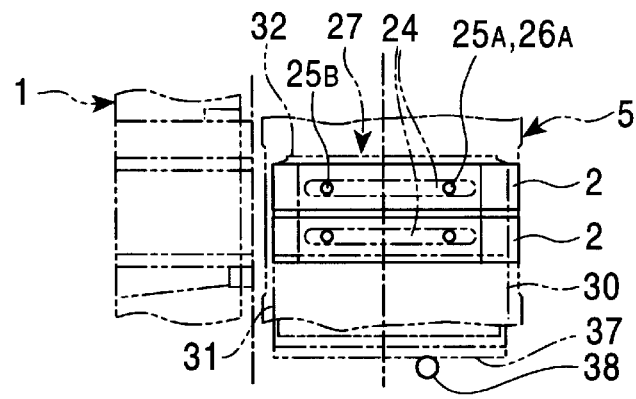
FIGS. 11A–11D are views useful in explaining an operation performed by the cartridge changing device to exchange cartridges with a punch press.
Figure 11B:
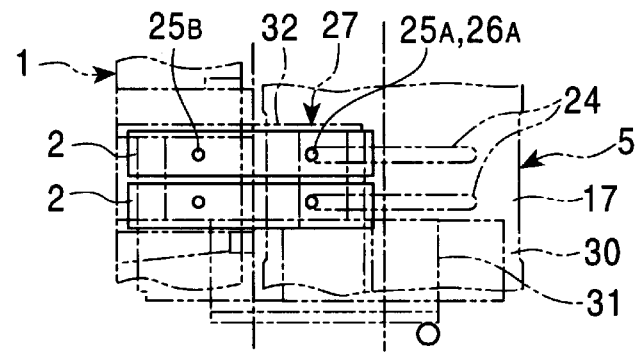
Figure 11C:
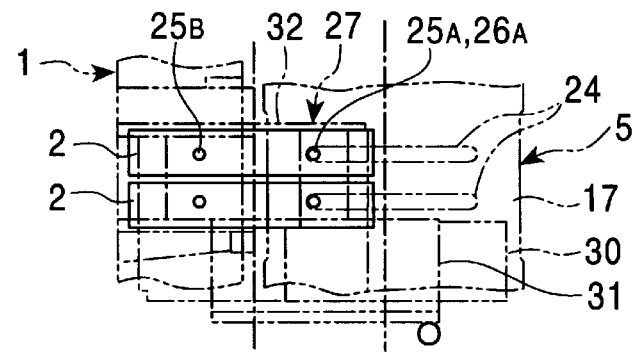
Figure 11D:
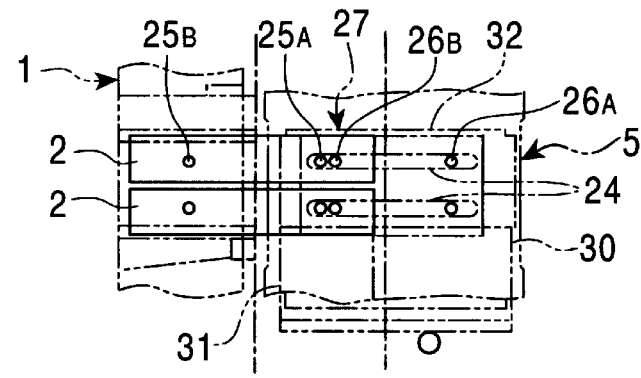

First, the engaging members 26A are engaged with the engaged portions 25A of the cartridges 2 (FIG. 11A). In this state, the slide member 27 is moved to insert the cartridges 2 into the punch press 1 (FIG. 11B). Subsequently, the engaging members 26A are removed from the engaged portions 25A and the slide member 27 is returned to the cartridge housing section 17 (FIG. 11D). In this manner, the cartridges 2, which have partly been loaded in punch press 1, are entirely loaded in the punch press 1 by means of the cartridge moving-in and -out device 8 (FIG. 1) provided in the punch press 1.

In this case, after the slide member 27 has partly inserted the cartridges 2 into the punch press 1 as shown in FIG. 11B, it may further be used to entirely insert the cartridges 2 into the punch press as described below. After the cartridges 2 have been inserted as shown in FIG. 11B, when the front engaged portions 26B of the cartridges 2 advance beyond the cartridge housing section 17, the engaging members 26B are engaged with the engaged portions 25B, while the engaging members 26A are removed from the engaged portions 25A (FIG. 11C). In this state, the slide member 27 is further advanced to entirely load the cartridges 2 in the punch press 1. Once the cartridges 2 have entirely been loaded, the engaging members 26B are removed and the slide member 27 is returned.

FIG. 12 shows an operation preformed when the cartridges 2 are transferred and loaded in the magazine 3. Since the engaging-member inserting windows 24A terminate before reaching the longitudinal ends of the magazine 3 as in the cartridge housing section 17, the following operation is preformed.

Figure 12A:
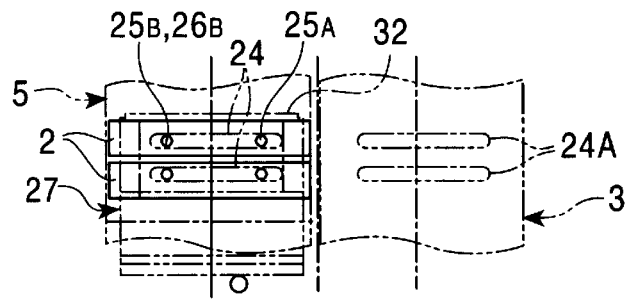
FIGS. 12A–12F are views useful in explaining an operation performed by the cartridge changing device to exchange cartridges with a magazine.
Figure 12B:
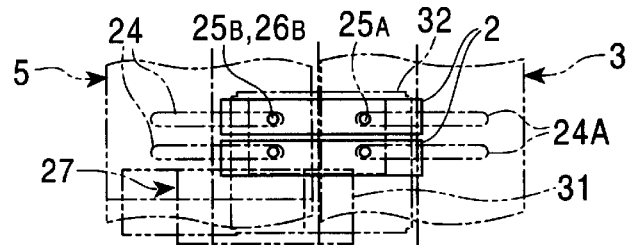
Figure 12C:
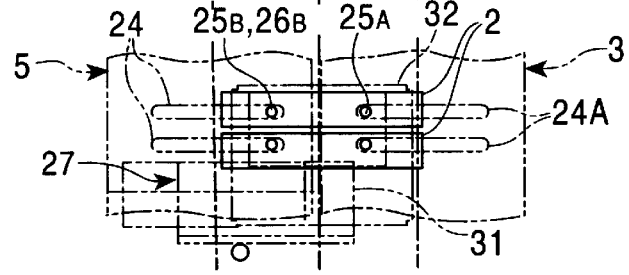
Figure 12D:
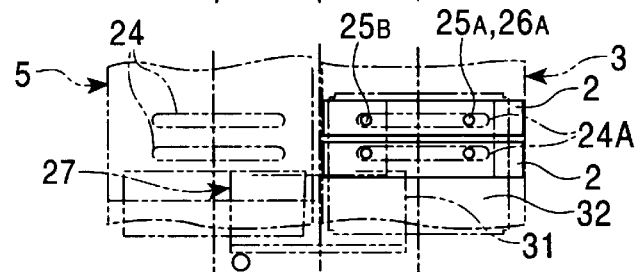
Figure 12E:
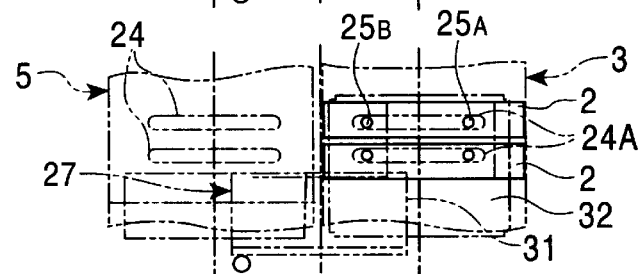
Figure 12F:
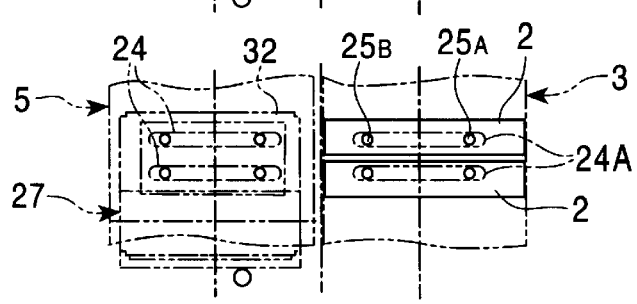

First, the engaging members 26B are engaged with the engaged portions 25B (FIG. 12A), and the slide member 27 is moved to insert the cartridges 2 into the magazine 3 (FIG. 12B). The engaging members 26A are engaged with the engaged portions 25A, while the engaging members 26B are removed (FIG. 12C). The slide member 27 is further moved to insert the cartridges 2 into the magazine 3 (FIG. 12D). The engaging members 26A are removed (FIG. 12E), and the slide member :27 is returned to the cartridge housing section 17.

Thus, although the engaging-member inserting windows 24, 24A do not penetrate the cartridge housing section or the magazine in the longitudinal direction, the cartridges 2 can be continuously moved by inserting and removing the engaging members 26.

The cartridges 2 are set up as described below. The cartridges 2 to be set up are transported on the transferring and loading cart 19 to before the setup station 60 and then stored in the setup section case 61 using the cartridge moving-in and -out mechanism 18.

Figure 17:
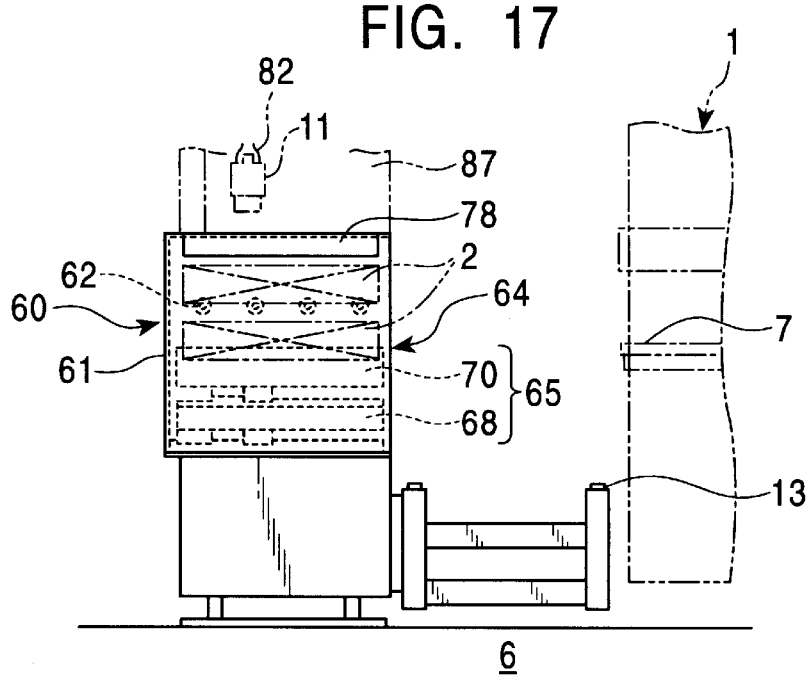
FIG. 17 is a view useful in explaining an operation of the vertical-cartridge-position shifting mechanism showing that this mechanism is not sliding.

In the setup station 60, after the storage, the opening and closing cover 78 is opened and a setup operation is performed, for example, the punch tool 11 of the upper cartridge 2 is replaced. Further, for the lower cartridge 2, a setup operation such as replacement of the die tool can be preformed with the opening and closing cover 78 open by drawing out the lower cartridge 2 from the setup section case 61 using the vertical-cartridge-position shifting mechanism 64, as shown in FIGS. 16 and 17. Since the vertical-cartridge-position shifting mechanism 64 draws out the lower cartridge 2 to the running path 6 for the transferring and loading cart 19, the setup operation for the lower cartridge 2 does not require an extra space. Thus, when the lower cartridge 2 has been drawn out to the running path 6 for the transferring and loading cart 19 or the opening and closing cover 78 of the setup station 60 is open, the interlock means 86 precludes the movement of the transferring and loading cart 19, thereby enabling safe transfer and loading.

Moreover, since the setup station 60 is located at the end of the row of the magazines 3, the setup operation can be performed in a large space and the transferring and loading cart 19, which is used for the magazines 3, can also be used to transport the cartridges 2 to the setup station.

Furthermore, the control box 87 is arranged over the plurality of magazines 3 as stated above, the space over the magazines 3, which are shorter than the punch press 1, can be effectively used to reduce the occupied floor area of the entire facility. Even with such arrangement of the control box 87, the setup operation can be preformed in a large space by locating the setup station 60 at the end of the row of the magazines 3.

A press with an automatic tool changing function according to the present invention comprises a punch press for using cartridges with tools mounted thereon to process works, the punch press having a change position where the cartridges are changed, and a cartridge transferring and loading device for drawing out the cartridges from the changing position via a linear path and transferring and loading the cartridges on a cartridge magazine located on an extension of the linear path, thereby reducing the amount of time required to change the cartridges.

If the cartridge transferring and loading device has a cartridge moving-in and -out mechanism that moves both forward and backward to transfer and load the cartridges both at the change position of the punch press and in the cartridge magazine, then the mechanism for changing the cartridges is simplified, thereby saving space and further reducing the amount of time required to change the cartridges.

If the cartridge moving-in and -out mechanism uses one actuator to drive both the moving-in and -out operations, the structure is further simplified to reduce costs.

A tool cartridge changing device of the present invention changes cartridges for a production device for processing works using tools mounted on the cartridges, and comprises a transferring and loading cart that runs on a linearly extending running path and a plurality of cartridge magazines arranged close to and parallel with the running path and in each of which the cartridges can be housed. The transferring and loading cart has a plurality of cartridge housing sections provided at the same pitch as an arrangement pitch of the cartridge magazines and cartridge moving-in and -out mechanisms each provided so as to correspond to one of the cartridge housing sections, for moving the cartridges into and out from the cartridge housing section. Therefore, the entire production facility including the production machine and the magazines can be simplified, and the amount of time required to change the cartridges can be reduced.

If cartridge moving-in and -out mechanism control means is provided for operating the plurality of cartridge moving-in and -out mechanisms of the moving cart in parallel, the amount of time required to change the cartridge is further reduced.

If the cartridge moving-in and -out mechanism control means operates each of the cartridge moving-in and -out mechanisms in such a manner as to move the cartridges from one of the cartridge housing sections of the transferring and loading cart to the cartridge magazine while loading the cartridges in the other cartridge housing section, then the amount of time required for the change is further reduced.

A tool cartridge changing device according to the present invention changes cartridges with tools mounted thereon for a production machine that uses the cartridges, and comprises a transferring and loading cart which has a cartridge moving-in and -out mechanism mounted thereon for moving the cartridge in and out and which runs on a linearly extending running path, a plurality of cartridge magazines contiguously arranged close to and parallel with the running path and in each of which the cartridges can be housed, and a setup station arranged contiguously at an end of a row of cartridge magazines in an arrangement direction thereof and in each of which the cartridges can be housed. Therefore, the entire production facility including the production machine and the magazines can be simplified, and the cartridges can be efficiently set up.

If the production machine is a punch press using a vertical pair of cartridges each having a punch tool and a die tool mounted thereon, the cartridge moving-in and -out mechanisms of the transferring and loading cart, the cartridge magazines, and the setup station each allow the vertical pair of cartridges to be simultaneously moved thereinto and out therefrom, and the setup station has a vertical-cartridge shifting mechanism for sliding the lower cartridge in a horizontal direction relative to the upper cartridge, then the punch tool and die tool mounted on the vertical pair of cartridges can be set up easily.

If the setup station has an opening and closing cover that covers a stored portion of the cartridge from above and interlock means for disabling the transferring and loading cart from moving to the setup station while the opening and closing cover is open, then the setup operation can be performed safely.

We claim:

1. A tool cartridge changing device with tools mounted thereon for a production machine that uses the cartridges, the device comprising a transferring and loading cart that runs on a linearly extending running path and a plurality of cartridge magazines arranged close to and parallel with said running path and in each of which the cartridges can be housed, said transferring and loading cart having a plurality of cartridge housing sections provided at the same pitch as an arrangement pitch of the cartridge magazines and cartridge moving-in and -out mechanisms each provided so as to correspond to one of the cartridge housing sections, for moving the cartridge into and out from the cartridge housing section.

2. A tool cartridge changing device according to claim 1, comprising cartridge moving-in and -out mechanism control means for operating the plurality of cartridge moving-in and -out mechanisms of said moving cart in parallel.

3. A tool cartridge changing device according to claim 2, wherein said cartridge moving-in and -out mechanism control means operates each of the cartridge moving-in and -out mechanisms in such a manner as to move the cartridges from one of the cartridges from one of the cartridge housing sections of the transferring and loading cart to the cartridge magazine while loading the cartridges from the cartridge magazine in the other cartridge housing section.

4. A tool cartridge changing device with tools mounted thereon for a production machine that uses the cartridges, the device comprising a transferring and loading cart which has a cartridge moving-in and -out mechanism mounted thereon for moving the cartridge in and out and which runs on a linearly extending running path, a plurality of cartridge magazines contiguously arranged close to and parallel with said running path and in each of which the cartridges can be housed, and a setup station arranged contiguously at an end of a row of cartridge magazines in an arrangement direction thereof and in each of which the cartridges can be housed, wherein said production machine is a punch press using a vertical pair of cartridges each having a punch tool and a die tool mounted thereon, the cartridge moving-in and -out mechanisms of said transferring and loading cart, said cartridge magazines, and said setup station each being able to allow the vertical pair of cartridges to be simultaneously moved thereinto and out therefrom, said setup station having a vertical-cartridge shifting mechanism for sliding the lower cartridge in a horizontal direction relative to the upper cartridge.

5. A tool cartridge changing device with tools mounted thereon for a production machine that uses the cartridges, the device comprising a transferring and loading cart which has a cartridge moving-in and -out mechanism mounted thereon for moving the cartridge in and out and which runs on a linearly extending running path, a plurality of cartridge magazines contiguously arranged close to and parallel with said running path and in each of which the cartridges can be housed, and a setup station arranged contiguously at an end of a row of cartridge magazines in an arrangement direction thereof and in each of which the cartridges can be housed, wherein said setup station has an opening and closing cover that covers a stored portion of the cartridge from above and interlock means for disabling said transferring and loading cart from moving to the setup station while the opening and closing cover is open.

* * * * *